(12) United States Patent
Villegas et al.

(10) Patent No.: US 12,033,261 B2
(45) Date of Patent: Jul. 9, 2024

(54) CONTACT-AWARE RETARGETING OF MOTION

(71) Applicant: Adobe Inc., San Jose, CA (US)

(72) Inventors: Ruben Villegas, Ann Arbor, MI (US); Jun Saito, Seattle, WA (US); Jimei Yang, Mountain View, CA (US); Duygu Ceylan Aksit, London (GB); Aaron Hertzmann, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 184 days.

(21) Appl. No.: 17/385,559

(22) Filed: Jul. 26, 2021

(65) Prior Publication Data
US 2023/0037339 A1    Feb. 9, 2023

(51) Int. Cl.
| | |
|---|---|
| *G06T 13/40* | (2011.01) |
| *G06N 3/04* | (2023.01) |
| *G06N 20/00* | (2019.01) |
| *G06T 7/215* | (2017.01) |
| *G06T 9/00* | (2006.01) |
| *G06V 40/10* | (2022.01) |

(52) U.S. Cl.
CPC ............. *G06T 13/40* (2013.01); *G06N 3/04* (2013.01); *G06N 20/00* (2019.01); *G06T 7/215* (2017.01); *G06T 9/00* (2013.01); *G06V 40/103* (2022.01)

(58) Field of Classification Search
CPC .......... G06N 20/00; G06N 3/04; G06T 13/40; G06T 7/215; G06T 9/00; G06V 10/82; G06V 40/103; G06V 40/23
See application file for complete search history.

(56) References Cited

U.S. PATENT DOCUMENTS

| | | | |
|---|---|---|---|
| 9,827,496 B1 | 11/2017 | Zinno | |
| 11,170,551 B1 | 11/2021 | Villegas et al. | |
| 11,430,308 B1* | 8/2022 | Zhang | ............... G08B 6/00 |
| 2006/0250402 A1 | 11/2006 | Perlin | |
| 2017/0308734 A1* | 10/2017 | Chalom | ............... G06F 18/24 |
| 2018/0096510 A1* | 4/2018 | Le | ............... G06T 13/40 |
| 2019/0205638 A1 | 7/2019 | Zhang et al. | |

(Continued)

OTHER PUBLICATIONS

Adobe Mixamo, Available Online at https://www.mixamo.com, Accessed from Internet on: Jul. 23, 2021, 7 pages.

(Continued)

*Primary Examiner* — Ming Wu
(74) *Attorney, Agent, or Firm* — Kilpatrick Townsend & Stockton LLP

(57) ABSTRACT

One example method involves a processing device that performs operations that include receiving a request to retarget a source motion into a target object. Operations further include providing the target object to a contact-aware motion retargeting neural network trained to retarget the source motion into the target object. The contact-aware motion retargeting neural network is trained by accessing training data that includes a source object performing the source motion. The contact-aware motion retargeting neural network generates retargeted motion for the target object, based on a self-contact having a pair of input vertices. The retargeted motion is subject to motion constraints that: (i) preserve a relative location of the self-contact and (ii) prevent self-penetration of the target object.

20 Claims, 13 Drawing Sheets

(56) References Cited

U.S. PATENT DOCUMENTS

| | | |
|---|---|---|
| 2019/0295305 A1 | 9/2019 | Yang et al. |
| 2020/0290203 A1 | 9/2020 | Taylor et al. |
| 2020/0349442 A1* | 11/2020 | Hsiao ..................... G06F 3/045 |
| 2020/0404793 A1* | 12/2020 | Smithson ................. H05K 3/00 |
| 2020/0410734 A1* | 12/2020 | Aoki ........................ G06T 15/04 |
| 2021/0103736 A1* | 4/2021 | Toyoda ................ G06V 40/103 |
| 2021/0343059 A1 | 11/2021 | Villegas et al. |

OTHER PUBLICATIONS

Aberman et al., Learning Character-Agnostic Motion for Motion Retargeting in 2D, ACM Transactions on Graphics, vol. 38, No. 4, Jul. 2019, pp. 75:1-75:14.

Aberman et al., Skeleton-Aware Networks for Deep Motion Retargeting, ACM Transactions on Graphics (TOG), vol. 39, No. 4, Jul. 2020, pp. 62:1-62:14.

Aristidou et al., Fabrik: A Fast, Iterative Solver for the Inverse Kinematics Problem, Graphical Models, vol. 73, No. 5, Sep. 2011, pp. 243-260.

Borno et al., Robust Physics-Based Motion Retargeting with Realistic Body Shapes, In Computer Graphics Forum, vol. 37, No. 8, Dec. 2018, pp. 1-12.

Choi et al., On-Line Motion Retargeting, Proceedings. Seventh Pacific Conference on Computer Graphics and Applications (Cat. No. PR00293), 1999, 11 pages.

Fragkiadaki et al., Recurrent Network Models for Human Dynamics, In Proceedings of the IEEE International Conference on Computer Vision, vol. 1, Sep. 29, 2015, pp. 1-9.

Gleicher, Retargetting Motion to New Characters, Proceedings of the 25th Annual Conference on Computer Graphics and Interactive Techniques SIGGRAPH '98, Jul. 1998, pp. 1-10.

Harish et al., Parallel Inverse Kinematics for Multithreaded Architectures, ACM Transactions on Graphics, vol. 35, No. 2, Feb. 2016, pp. 19:1-19:13.

Hassan et al., Resolving 3D Human Pose Ambiguities with 3D Scene Constraints, Proceedings of IEEE International Conference on Computer Vision (ICCV), Aug. 20, 2019, 18 pages.

Hasson et al., Learning Joint Reconstruction of Hands and Manipulated Objects, 2019 IEEE/CVF Conference on Computer Vision and Pattern Recognition (CVPR), Apr. 11, 2019, pp. 1-14.

Ho et al., Motion Adaptation for Humanoid Robots in Constrained Environments, 2013 IEEE International Conference on Robotics and Automation, May 6-10, 2013, pp. 3813-3818.

Ho et al., Spatial Relationship Preserving Character Motion Adaptation, ACM Transactions on Graphics, vol. 29, No. 4, Jul. 2010, pp. 33:1-33:8.

Holden et al., A Deep Learning Framework for Character Motion Synthesis and Editing, ACM Transactions on Graphics, vol. 35, No. 4, Jul. 28, 2016, 11 pages.

Kim et al., Interactive Character Posing with Efficient Collision Handling, Computer Animation and Virtual Worlds, vol. 31, No. 3, May-Jun. 2020, pp. 1-12.

Kolotouros et al., Learning to Reconstruct 3D Human Pose and Shape via Model-Fitting in the Loop, In Proceedings of the IEEE International Conference on Computer Vision, Sep. 27, 2019, 10 pages.

Lee et al., A Hierarchical Approach to Interactive Motion Editing for Human-like Figures, SIGGRAPH '99: Proceedings of the 26th annual conference on Computer graphics and interactive techniques, Jul. 1999, pp. 39-48.

Lim et al., PMnet: Learning of Disentangled Pose and Movement for Unsupervised Motion Retargeting, In British Machine Vision Conference (BMVC), 2019, pp. 1-13.

Lyard et al., Motion Adaptation Based on Character Shape, Computer Animation and Virtual Worlds, vol. 19, Nos. 3-4, Jul. 25, 2008, pp. 189-198.

Popovic et al., Physically Based Motion Transformation, Proceedings of the 26th Annual Conference on Computer Graphics and Interactive Techniques (SIGGRAPH '99), Aug. 8-13, 1999, pp. 1-10.

Qi et al., PointNet: Deep Learning on Point Sets for 3D Classification and Segmentation, In the IEEE Conference on Computer Vision and Pattern Recognition (CVPR), Apr. 10, 2017, 19 pages.

Rempe et al., Contact and Human Dynamics from Monocular Video, In European Conference on Computer Vision, Jul. 24, 2020, pp. 1-27.

Smith et al., Constraining Dense Hand Surface Tracking with Elasticity, ACM Transactions on Graphics, vol. 39, No. 6, Dec. 2020, pp. 1-14.

Tak et al., A Physically-Based Motion Retargeting Filter, ACM Transactions on Graphics, vol. 24, No. 1, Jan. 2005, pp. 98-117.

Teschner et al., Collision Detection for Deformable Objects, In Eurographics, Computer Graphics Forum, vol. 24, No. 1, Mar. 2005, 21 pages.

Tzionas et al., Capturing Hands in Action using Discriminative Salient Points and Physics Simulation, International Journal of Computer Vision (IJCV), vol. 118, No. 2, Mar. 7, 2016, pp. 1-24.

Unzueta et al., Full-Body Performance Animation with Sequential Inverse Kinematics, Graphical Models, vol. 70, No. 5, Sep. 2008, pp. 87-104.

Villegas et al., Neural Kinematic Networks for Unsupervised Motion Retargetting, In the IEEE Conference on Computer Vision and Pattern Recognition (CVPR), Jun. 2018, pp. 8639-8648.

Wei et al., Dense Human Body Correspondences Using Convolutional Networks, 2016 IEEE Conference on Computer Vision and Pattern Recognition (CVPR), vol. 1, 2016, pp. 1544-1553.

Zhang et al., Generating 3D People in Scenes Without People, In Computer Vision and Pattern Recognition (CVPR), Apr. 19, 2020, 20 pages.

"Mixamo—Get Animated", Available online at: https://www.mixamo.com/#/, Mar. 6, 2020, 6 pages.

Bogo, et al., "Keep it SMPL: Automatic Estimation of 3D Human Pose and Shape from a Single Image", Computer Vision—European Conference on Computer Vision 2016, Oct. 2016, 18 pages.

Goodfellow, et al., "Generative Adversarial Nets", Advances in Neural Information Processing Systems, vol. 27, Available online at: https://arxiv.org/pdf/1406.2661v1.pdf, Jun. 10, 2014, pp. 1-9.

Pavlakos, et al., "Learning to Estimate 3D Human Pose and Shape from a Single Color Image", In Proceedings of the Institute of Electrical and Electronics Engineers, Conference on Computer Vision and Pattern Recognition, Available online at: https://arxiv.org/pdf/1805.04092.pdf, May 10, 2018, 10 pages.

Xiang, et al., "Monocular Total Capture: Posing Face, Body, and Hands in the Wild", The Institute of Electrical and Electronics Engineers, Conference on Computer Vision and Pattern Recognition (CVPR), Dec. 4, 2018, 17 pages.

Zhou, "On the Continuity of Rotation Representations in Neural Networks", Available online at: https://arxiv.org/abs/1812.07035, Apr. 19, 2019, 13 pages.

* cited by examiner

CONTACT-AWARE RETARGETING OF MOTION

TECHNICAL FIELD

This disclosure generally relates to retargeting of motion sequences and, more specifically, to contact-aware motion retargeting, providing a framework for retargeting source motion that preserves relative contact points and prevents self-penetrations of target objects.

BACKGROUND

Computer-based animation systems are implemented to generate and edit digitally animated target objects, such as part of three-dimensional ("3D") computer graphics techniques. One particularly useful computer animation technique utilizes motion retargeting that attempts to capture motion data describing the motion of one animated visual object, and transfer the motion data to animate a different visual object. Motion retargeting, for instance, captures motion data from a variety of different visual objects, such as existing animations of computer-generated imagery, videos of real-world visual objects in motion (e.g., humans, animals), and so on. The captured motion data is "retargeted" to a different visual object, e.g., a target object, to cause the target object to mimic the motion of the original visual object.

Despite making advances in retargeting motion, existing computer-based systems have a number of shortcomings. In particular, conventional techniques for motion retargeting, however, exhibit a number of implementation challenges. For instance, differences in visual structure between different visual objects cause inaccuracies (e.g., unrealistic appearance), inefficiencies, and inflexible implementations when attempting to transfer motion data to target objects. Consider, for example, an implementation where motion data from a source visual object is to be captured and transferred to a target visual object, such as between different computer-generated depictions of humans. The source object, however, includes different skeletal dimensions than the target object, such as longer legs, longer arms, and so forth. Conventional motion retargeting techniques fail to accurately compensate for this difference in skeletal structure, and thus introduce errors when attempting to transfer motion data from the source object to the target object.

SUMMARY

Certain aspects of the present disclosure involve methods, systems and non-transitory computer-readable mediums having instructions stored thereon for contact-aware motion retargeting. The present disclosure includes a framework that provides contact-aware motion retargeting that is leveraged in a digital medium environment, such as a computer-implemented animation environment. Generally, the described techniques provide for increased accuracy in retargeting motion data from a source motion sequence to a target visual object. Accordingly, to mitigate the challenge of undesired visual artifacts in retargeting motion to a target visual object, the described techniques position the target object in a defined virtual environment to identify motion constraints of the target object relative to the virtual environment. Further, the described techniques utilize an iterative optimization process that fine tunes the conformance of retargeted motion of a target object to the identified motion constraints.

In addition, certain aspects involve contact-aware motion retargeting that preserves self-contacts and prevents self-penetration. Self-contacts, such as when hands touch each other or the torso or the head, are important attributes of human body language and dynamics. Self-penetrations, such as when a hand or limb passes into the torso or through another limb, are implausible behavior in an animated character, and can be disruptive or distracting to a viewer of an animated character. Certain aspects of the present disclosure employs inputs that include a source motion sequence, target skeleton, and target geometry. The animation system described herein identifies self-contacts and foot contacts in the source motion sequence and optimizes a retargeted motion to apply to the target skeleton and target geometry. The retargeted motion preserves the self-contacts and foot contacts while reducing self-penetrations. Further, the animation system provides a geometry-conditioned recurrent network that utilizes an encoder-space optimization strategy to achieve a more efficient retargeting of the input motion sequence, while satisfying motion constraints (e.g., including contact constraints). As a result, the animation system described herein quantitatively outperforms existing computer-based systems, producing higher-quality retargeted motion.

One example method involves contact-aware motion retargeting in which one or more processing devices perform operations that include receiving source motion for a source object. The source motion is associated with a time period. The source object is characterized by a source object skeleton and a source object geometry. The source motion comprises a motion of the source object skeleton and a motion of the source object geometry over the time period. The source motion includes, at a first time in the time period, a contact between a first source vertex and a second source vertex in the source object geometry. The operations include retargeting the source motion to a target object. The target object is characterized by a target object skeleton and a target object geometry. The target object geometry is different from the source object geometry. The retargeting causes the target object to have a target motion, over the time period, that is based on the source motion. At the first time in the target motion, a first target vertex and a second target vertex of the target source object are in contact. In addition, the first target vertex and the second target vertex are in contact without any self-penetration of the target object geometry.

Another example involves a system for retargeting motion, the system comprising a trained contact-aware motion retargeting neural network. The trained contact-aware motion retargeting neural network receives source motion for a source object. The source motion is associated with a time period. The source object is characterized by a source object skeleton and a source object geometry. The source motion comprises a motion of the source object skeleton and a motion of the source object geometry over the time period. The source motion includes, at a first time in the time period, a contact between a first source vertex and a second source vertex in the source object geometry. The trained contact-aware motion retargeting neural network retargets the source motion to a target object. The target object is characterized by a target object skeleton and a target object geometry. The target object geometry is different from the source object geometry. The retargeting causes the target object to have a target motion, over the time period, that is based on the source motion. At the first time in the target motion, a first target vertex and a second target vertex of the target source object are in contact. In addition, the first target vertex and the second target vertex are in contact without any self-penetration of the target object geometry.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of this disclosure are better understood when the following Detailed Description is read with reference to the drawings.

FIG. 2, including

FIG. 7, including

DETAILED DESCRIPTION

Figure 1:
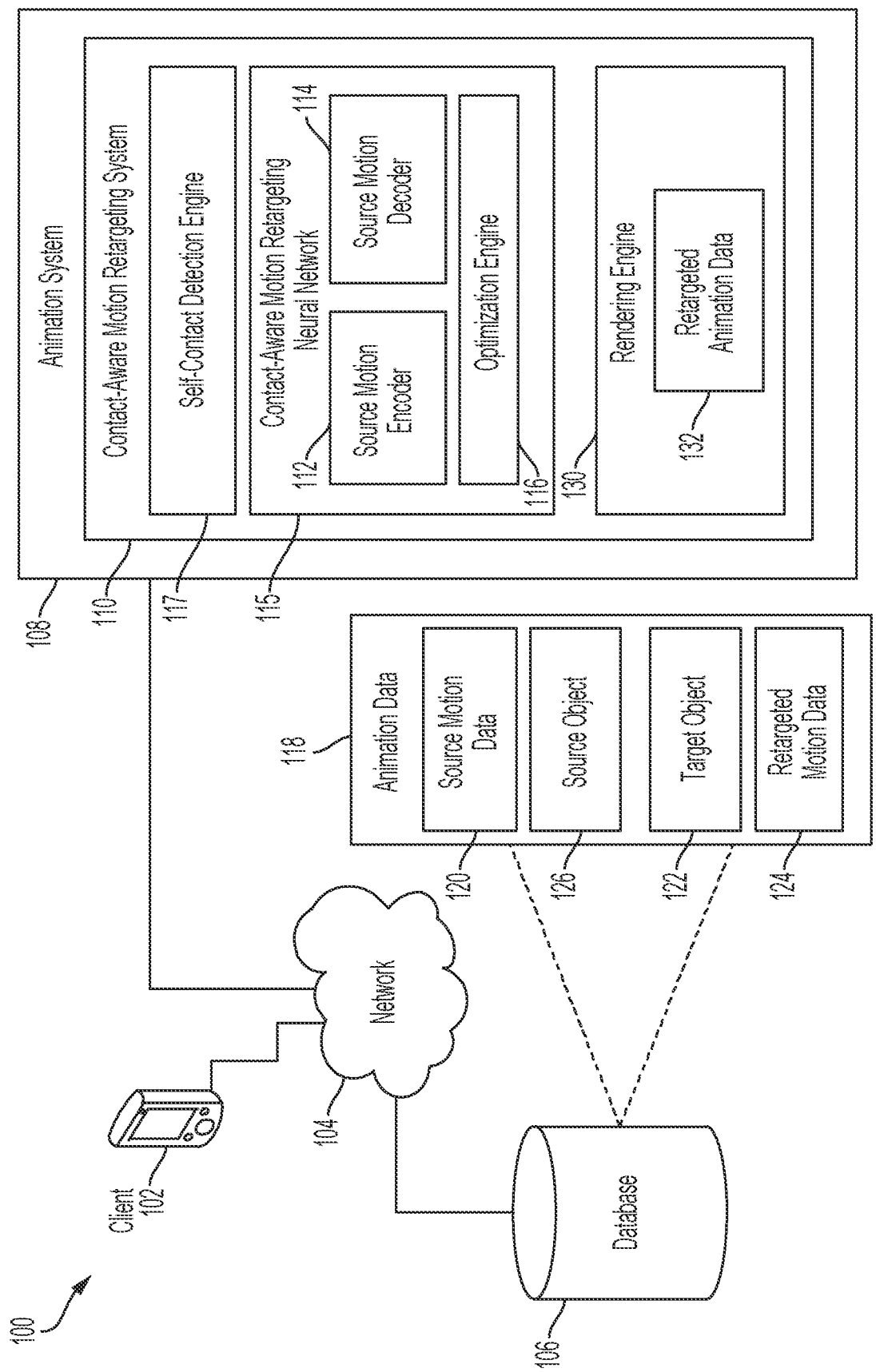
FIG. 1 depicts an example of a computing environment for contact-aware motion retargeting, according to certain aspects of this disclosure.

Certain aspects involve contact-aware retargeting of skinned motion that provides a framework to apply source motion to one or more target objects. The contact-aware retargeting preserves contact points of the source motion without self-penetration of the target objects. For example, certain aspects disclosed herein include a machine-learning model that provides contact-aware retargeting of skinned motion that is leveraged in a digital medium environment. The following non-limiting examples are provided to introduce certain aspects of this disclosure.

In one example, the animation system receives an input from a client device (e.g., a user input, request, button press, graphical user interface ("GUI") selection, text input, speech-to-text input, gesture) that includes a source motion sequence and a target visual object for motion retargeting from the source motion sequence. The source motion sequence, for instance, includes source motion data that describes motion of a source visual object over time, such as motion of a digital character, motion from capture of live-action motion of a real-world entity, and so forth. Generally, the source motion data describes a motion of the source object in various ways, such as with reference to rotations of joints of the source object, and movement of a "root joint" (e.g., a hip joint) of the source object. Further, the source motion data describes dimensions of the source object, such as source object height, length of source object limbs, and so forth, as well as joint coordinates for joints of the source object. Further, the target visual object includes data describing attributes of the target object, such as target object dimensions, joint coordinates, and so forth.

Accordingly, a retargeting process uses the source motion sequence and the target object to generate retargeted motion data that applies the source motion sequence to the target object to retarget motion of the source object to the target object. Generally, this enables the target object to be animated to simulate the source motion sequence. In at least one implementation, the retargeting includes using a recurrent neural network ("RNN") including an encoder RNN and a decoder RNN. The encoder RNN, for instance, encodes attributes of the source motion sequence, such as joint coordinates and root velocities of the source object. The decoder RNN decodes the encoded attributes along with attributes of the target object to generate joint rotations and root motion to be applied to the target object. Further, a forward kinematics layer processes the target object joint rotations to generate different "poses" of the target object, which includes different sets of joint coordinates for the target object as part of a retargeted motion sequence.

A self-contact occurs when one part of a person's body, or a computer-generated object representing a body, comes into contact with another part of the body. Self-contacts are interpreted by a viewer as part of how the viewer perceives human motion. Self-contacts often indicate different behaviors or emotional states. For example, a person might rest their head in their hands if they are concerned or thoughtful, whereas certain dance moves require a person's hands to be placed on their hips. Conversely, implausible self-contacts, such the person's hands passing through one another, ruin the physical plausibility of a motion. Thus, handling self-contacts is crucial for reconstructing, interpreting, and synthesizing human motion. Generally, existing computer-based systems do not consider self-contacts, which frequently leads to implausible self-penetrations and a failure to preserve important self-contacts. Further, synthesizing contacts for a skinned character requires knowledge of the character's geometry (e.g., a 3D geometry and/or target geometry), such as body shape or size of the character. Accordingly, synthesizing such contacts cannot be accurately determined from a skeleton alone.

The present disclosure includes a contact-aware motion retargeting system that includes one or more algorithms that preserve both self-contacts and foot contacts. In some cases, the motion retargeting system includes one or more algorithms that reduce self-penetrations. For instance, the contact-aware motion retargeting system takes an input human motion (e.g., a source motion) and a target character (e.g., a target object), and produces a plausible animation that manifests how that target character might perform the input motion. From the input motion, the contact-aware motion retargeting system identifies self-contacts, such as placement of hands on the body, and foot contacts, such as placement of feet on the ground. The contact-aware motion retargeting system employs an energy function that preserves these self-contacts and foot contacts in the output motion, while reducing any self-penetrations in the output.

Further, the contact-aware motion retargeting system uses self-contacts from the character's geometry and foot contacts from the character skeleton, in order to ensure that the self-contacts and foot contacts will be accurately transferred in the rendered, skinned motion.

Due to the difficulty of directly optimizing a full motion sequence, in one example, the motion retargeting system builds on a previous model and includes training a recurrent neural network ("RNN") to perform retargeting. However, the RNN does not perfectly satisfies motion constraints (e.g., contact constraints) given a propensity for efficient inferences. Therefore, the motion retargeting system includes an optimization engine for encoder-space optimization, in which the RNN's predictions are refined by iteratively optimizing hidden units from the RNN's encoder. In doing so, the motion retargeting system more efficiently satisfies motion constraints by taking advantage of the RNN's smooth, disentangled encoder-space.

In some cases, a conventional motion retargeting technique assumes that an input geometry (e.g., a character "skin" associated with a source object) and an output geometry (e.g., a character "skin" of a target object) have the same or substantially similar joint angle parameters. But, in some examples, a skeleton shape and a skin geometry or topology may be very different between the two objects (e.g., source and target animated characters). The conventional motion retargeting technique can fail to identify self-contacts of the source object. In addition, the conventional motion retargeting technique can fail to identify differences between the input geometry and the output geometry, such as areas at which self-contacts of the source object result in self-penetrations of the target object.

Further, retargeting motion data from live action video is challenging due to input noise from the video capture process, and differences between human motion (and/or other biological entities) and the way in which 3D computer-generated characters are animated. Generally, errors introduced in such conventional motion retargeting techniques accumulate over time and cause undesired artifacts in retargeted motion of a target visual object, such as floating, sinking, surface skating, and other unintended visual attributes. Moreover, these existing computer-based systems do not model or preserve self-contacts (e.g., when a character's hand touches its torso or head). Likewise, self-penetrations, such as a hand passing into the torso, are a typical artifact of motion estimation methods.

Accordingly, conventional motion retargeting introduces errors in motion retargeting between visual objects, which often requires manual intervention to correct such errors. As a result, motion retargeting in conventional animation systems is inaccurate and burdensome from a user perspective and on system resources. This presents an undesirable user experience, and wastes system resources (e.g., processor bandwidth, memory, network bandwidth) utilized to correct inaccurately transferred motion data.

Some conventional computer-based systems for motion retargeting iteratively optimize a models with hand-designed objectives for end-effectors to preserve the essence of a motion retargeted from one skeleton to another skeleton. For instance, some models adjust a position of end-effectors based on an algorithm or design from a computer animator. But such models rely on humans to discover properties of a motion and transfer such properties from one skeleton to another. By relying on humans, these models often introduce inaccuracies and fail to identify important features of a motion or skeleton when retargeting a motion between different skeletons.

Because conventional computer-based systems for motion retargeting lack the technology to accurately retarget a motion between different skeletons, conventional computer-based techniques often provide a tedious and user-intensive process. These conventional computer-based techniques prompt computer animators to use individual editing tools to modify joint positions or joint rotations to match a source motion. In such cases, the additional user input for joint position and rotation adjustments further consumes processing capacity and time.

In addition to the inaccuracies and inefficiencies of some conventional techniques that are used to retarget motion, training models to retarget a motion is expensive and is often unreliable. Data sets, with a ground truth for a retargeted motion on a different skeleton, are limited and difficult for computer animators to generate. Paired motion data for different skeletons (e.g., features for different skeletons performing the same motion) are difficult to find or generate, which undermines the feasibility and reliability of such machine-learning approaches.

In some examples, hands participate in meaningful self-contacts (e.g., contacts from hand to head, hand to hand, hand to hip). Thus, certain aspects of contact-aware motion retargeting systems described herein focus on self-contacts between the hands and other portions of a target geometry for a target character. It should be appreciated that a usage of target geometry generally means that an output style will depend on a size and/or shape of a character's skin (e.g., a mesh of triangles representing shape and appearance of a character). Therefore, a character geometry that is bulkier will be more constrained in its movements, than a character geometry that is more diminutive or compact.

These constrained movements are reflected in test results described herein. The present disclosure further includes test results associated with various complex motion sequences, using a wide range of target geometries from skinny to bulky. The results show that the motion retargeting system provides a good balance between preserving source motion properties while preserving self-contacts and reducing implausible self-penetrations, especially when compared with existing computer-based systems.

Example Computing Environment for Contact-Aware Retargeting of Skinned Motion

Referring now to the drawings, FIG. 1 depicts an example of a computing environment 100 for contact-aware retargeting of skinned motion, according to certain aspects of this disclosure. In the example computing environment 100 depicted in FIG. 1, various client devices 102 access an animation system 108 via a data network 104. The client devices 102 can include a personal computer, a laptop, a personal assistant device, a smartphone, or other personal or professional devices suitable for performing animation techniques. In some aspects, as in the example computing environment 100 of FIG. 1, the animation system 108 includes a contact-aware motion retargeting system 110. In additional or alternative aspects, the motion retargeting system 110 could be implemented in separate, independently operated computing systems. Further, in additional or alternative aspects, the animation system 108 could reside on the client device 102 (e.g., in the form of an application and/or other logic).

The animation system 108 includes one or more devices that provide and execute one or more engines, modules, applications, or other logical components for providing one or more digital experiences to the user. The animation system 108 is implemented using, for example, one or more of processing devices, servers, platforms, virtual systems, cloud infrastructure, or other suitable components (or combinations of components). In addition, each engine (or other logical component) is also implemented using one or more servers, one or more platforms with corresponding application programming interfaces, cloud infrastructure, and the like. The animation system 108 uses the one or more processing devices to execute suitable program code for performing one or more functions. Examples of this program code include software components depicted in FIG. 1, such as motion retargeting system 110, source motion encoder 112, source motion decoder 114, self-contact detection engine 117, rendering engine 130, and/or optimization engine 116. In some cases, the animation system 108 is accessible via one or more corresponding application programming interfaces.

In some examples, the animation system 108 is implemented using a cloud infrastructure or cloud computing environments. Generally, "cloud computing" is defined as a subscription model for enabling on-demand network access to a shared pool of configurable computing resources. For example, cloud computing includes implementations that provide on-demand access to the shared pool of configurable computing resources. In some examples, configurable computing resources from the shared pool are rapidly provisioned, such as via virtualization, and are released with low management effort or service provider interaction. In some cases, cloud computing can provide configurable computing resources that are scalable, such as automatic scaling.

In some aspects, a cloud computing model includes a cloud computing subscription model. The cloud computing subscription model is composed of various characteristics such as, for example, on-demand self-service, broad network access, resource pooling, rapid elasticity, measured service, and so forth. The cloud computing subscription model also includes various service subscription models, such as, for example, Software as a Service ("SaaS"), a web service, Platform as a Service ("PaaS"), and Infrastructure as a Service ("IaaS"). Further, the cloud computing subscription model is deployed using different deployment subscription models such as private cloud, community cloud, public cloud, hybrid cloud, and so forth. As described herein, a "cloud computing environment" is an environment in which cloud computing is employed.

The animation system 108 uses one or more of these engines to receive an input that includes a retargeting request. As described in detail with respect to the various examples below, the animation system 108 uses a trained contact-aware motion retargeting system 110 to retarget motion into different objects. For example, the animation system 108 receives an input from the client device 102 that includes a request to retarget a source motion into a target object. To service the request, the animation system 108 executes the contact-aware motion retargeting system 110. To enable its various functionality, the contact-aware motion retargeting system 110 leverages one or more of a self-contact detection engine 117, a contact-aware motion retargeting neural network 115, a source motion encoder 112, a source motion decoder 114, or an optimization engine 116.

The contact-aware motion retargeting system 110 includes one or more trained machine-learning model that generates the requested target object with the applied source motion. For example, the motion retargeting system 110 receives input motion data, such as from a source motion sequence. In addition, the motion retargeting system 110 applies the trained machine-learning model to the input motion data to generate output motion data that is "retargeted" (e.g., applied) to a target visual object (or multiple target visual objects) to animate the target visual object.

In some examples, the contact-aware motion retargeting system 110 includes one or more machine-learning models that are trained to utilize artificial intelligence ("AI") techniques to identify key characteristics of input motion data, such as source motion. In some cases, the trained machine-learning models provide output motion data that accurately applies the input motion data to animate the target object. For instance, the contact-aware motion retargeting neural network 115 is trained to identify motion features of source motion. In addition, the contact-aware motion retargeting neural network 115 is trained to generate retargeted motion data, such as retargeted motion data 124. The trained contact-aware motion retargeting neural network 115 generates the retargeted motion data 124 using animation data 118, including source motion data 120 and a target object 122 from a repository (e.g., database 106).

In some cases, the trained contact-aware motion retargeting neural network 115 applies one or more motion constraints. The motion constraints can improve the retargeted motion data 124, such as improving accuracy of the retargeted motion data 124 compared to the source motion data 120. In the animation system 108, the motion constraints are identified by the self-contact detection engine 117. The self-contact detection engine 117 identifies, within the source motion data 120, one or more pairs of source vertices that are in contact, e.g., self-contact vertex pairs. The source vertices describe, for instance, a geometry (e.g., a character "skin") of a source object. For example, if the source motion data 120 describes a character that is touching its right hand to its left shoulder, the self-contact detection engine 117 identifies a self-contact vertex pair that includes a first source vertex in the skin of the right hand and a second source vertex in the skin of the left shoulder. The self-contact detection engine 117 identifies the first source vertex and second source vertex as a self-contact vertex pair. In addition, the contact-aware motion retargeting system 110 can identify one or more self-contact vertex pairs as motion constraints, such as constraints on retargeted motion that is generated by the trained contact-aware motion retargeting neural network 115.

In some cases, the self-contact detection engine 117 identifies corresponding vertices between a source object and a target object. For example, the self-contact detection engine 117 identifies, in a target visual object, a particular vertex that corresponds to a particular vertex in a source visual object, such as a correspondence between vertices in a right hand of the source object and respective vertices in a right hand of the target object. An example technique to determine correspondence among vertices is K-nearest neighbor technique applied to vertices in the source object geometry and target object geometry, but other techniques may be used to identify corresponding vertices. In addition, the self-contact detection engine 117 identifies one or more vertex pairs in the target object as motion constraints on the retargeted motion. In some cases, the self-contact detection engine 117 stores a data structure that describes the self-contact vertex pairs as motion constraints, such as a vector that lists tuples of the self-contact vertex pairs in the target object.

In additional or alternative aspects, the self-contact detection engine 117 identifies foot-ground contact constraints, such as a source vertex of a foot (e.g., a heel joint in a source skeleton, a foot vertex in a source geometry) that is within a threshold distance of a ground surface (e.g., in a virtual environment). In some cases, the contact-aware motion retargeting system 110 can identify one or more foot-ground contacts as motion constraints, such as constraints on retargeted motion that is generated by the trained contact-aware motion retargeting neural network 115. For example, the trained contact-aware motion retargeting neural network 115 accesses one or more motion constraints identified by the self-contact detection engine 117, such as by accessing a data structure that describes self-contact vertex pairs, foot-ground contacts, or additional identified motion constraints.

In some cases, the contact-aware motion retargeting system 110 includes functionality for positioning retargeted motion data within a virtual environment. The virtual environment can include a computer-generated environment in which a target object is to be animated via the retargeted motion data. For instance, the motion retargeting system 110 positions retargeted motion data within a coordinate system (e.g., an xyz coordinate system, a polar coordinate system) to enable a target visual object that is animated via the retargeted motion data to be appropriately positioned within the coordinate system. In some cases, the virtual environment includes visual data, such as computer-generated imagery describing a visual appearance of the virtual environment, such as for a user viewing the environment via a display device.

Further, the animation system 108 includes an optimization engine 116 that optimizes a target object's position within the virtual environment (e.g., coordinate system) to enable the target object to comply with certain motion constraints within the virtual environment. As part of retargeting motion data to a target object, for instance, the optimization engine 116 optimizes the visual object's velocity (or other motion attribute) in a virtual environment to enable the visual object to exhibit an appropriate visual relationship to other objects within the virtual environment, such as a floor, a wall, additional characters, or other types of objects in the virtual environment. In some cases, the optimization engine 116 optimizes one or more data structures used by the contact-aware motion retargeting neural network 115, such as a data structure indicating encoded motion features.

The animation system 108 accesses animation data 118 stored in database 106. The animation data 118 is used to perform various aspects of motion retargeting with motion constraints described herein. For instance, the animation data 118 includes at least one source object 126, source motion data 120, at least one target object 122, and retargeted motion data 124.

The source object 126, for instance, represents a visual object associated with the source motion data 120. The source object 126 can be, for example, an animated character generated by a computer-implemented graphics editing system, video footage of a person, or another suitable visual object associated with source motion. The source object 126 includes model data that describes the source visual object, such as skeleton data describing relative positions of skeleton joints or geometry data describing relative positions of vertices in the model's skin. In some cases, the source object 126 is a computer-generated character model that is positioned in a reference pose (e.g., a T-pose). In additional or alternative aspects, the source object 126 includes data describing a real-world entity that is captured in motion (e.g., video footage of a human), or other visual or graphical objects that are associated with source motion.

In addition, the source motion data 120 includes motion data that describes how the source object 126 is animated. Accordingly, the source motion data 120 includes data that describes various visual and motion attributes of the source object 126. The source motion data 120 includes data that describes motion at one or more time frames, e.g., time frame t, t−1, t−2, etc. In addition, the source motion data 120 describes positions, velocities, rotations, or other attributes of the source object 126 across multiple time frames in the motion data. For example, the source motion data 120 includes skeleton data that describes relative positions and/or orientations of skeleton joints during the described motion. In addition, the source motion data 120 includes geometry data that describes relative positions of skin vertices during the described motion. Further, the source motion data 120 includes velocity data that describes relative velocity of the source object 126 during the motion, such as a velocity of a root joint (e.g., a hip joint) with respect to a virtual environment in which the motion occurs. Other types of motion data can be represented by the source motion data 120.

The target object 122 represents a visual object that is animated using retargeted motion data from the source motion data 120. The target object 122 can be, for example, a two-dimensional ("2D") character, a 3D character, or another type of computer-generated imagery suitable for animation via retargeted motion. The target object 122 includes model data that describes the target visual object, such as skeleton data for the target object's joints or geometry data for the target object's skin. In some cases, the target object 122 is a computer-generated character model that is positioned in a reference pose (e.g., a T-pose).

The retargeted motion data 124 includes motion data that is retargeted into the target object 122. The motion retargeting system 110, for instance, receives the source motion data 120 and the target objects 122 as input, and applies techniques for motion retargeting with motion constraints described herein to generate the retargeted motion data 124. In some cases, the retargeted motion data 124 is generated by the contact-aware motion retargeting neural network 115. For example, the retargeted motion data 124 is generated based on motion features that are extracted from the source motion data 120, model features of the joints or geometry of the target object 122, or other types of data inputs to the neural network 115. In addition, the retargeted motion data 124 is retargeted into the target object 122. In some cases, the retargeted motion data 124 can cause (e.g., in a virtual environment) the target object 122 to move in a similar manner as the source motion data 120. In addition, the trained contact-aware motion retargeting neural network 115 generates retargeted motion data 124 that accurately recreates the source motion data 120 even if the target object 122 has different geometry as compared to the source object 126. For example, if the target object 122 represents a character that is very tall and bulky as compared to an average-sized character represented by the source object 126, the trained neural network 115 generates retargeted motion data 124 that causes the tall, bulky target object 122 to accurately move in motions similar to the average-sized source object 126.

In FIG. 1, the contact-aware motion retargeting system 110 includes a rendering engine 130. The rendering engine 130 is configured to render animation data based on one or more of the target object 122 and the retargeted motion data 124. For example, the rendering engine 130 renders (or otherwise generates) retargeted animation data 132. The retargeted animation data 132 includes computer-animated imagery that depicts the target object 122 moving according to the retargeted motion data 124. In addition, the target object 122 is animated to perform motion that emulates (e.g., imitates) motion of the source motion data 120. In some cases, the animation system 108 provides the retargeted animation data 132 to the client device 102 for display. FIG. 1 depicts the contact-aware motion retargeting system 110 as including the rendering engine 130, but other implementations are possible. For example, the animation system 108 may include one or more additional components configured to render retargeted animation data. In addition, the client device 102 or an additional computing system may be configured to render retargeted animation data.

For instance, the motion retargeting system 110 provides one or more of the target object 122 or the retargeted motion data 124 to an additional computing system, such as the client device 102. In additional or alternative aspects, the motion retargeting system 110 provides one or more of the target object 122 or the retargeted motion data 124 to an additional computing system that is configured to render computer-animated imagery based on the target object 122 or the retargeted motion data 124.

Further to the example computing environment 100, the animation system 108 includes instructions to generate a graphical user interface ("GUI") that enables various user interactions described herein. The GUI is output via to a display device of the client device 102, and enables user interactions with the animation system 108 (e.g., via the GUI). Further, output from the animation system 108 is displayed via the GUI on the client device 102.

Some aspects of the computing environment 100 include client devices 102. In one example, the client device 102 is operated by a client entity (e.g., a commercial entity, a content provider) requesting retargeted motion for a visual object from a database of objects (e.g., database 106) using techniques discussed herein. Such requests are performed by sending a request (e.g., an automated input) directly to the animation system 108. In another example, the client device 102 is operated by an end user who desires to create retargeted motion for a visual object of interest. For instance, an end user enters a user input that includes a request to generate a virtual character that is based on a person that is contained within a personal photograph or video recording.

Examples of a client device 102 include, but are not limited to, a personal computer, a laptop, a tablet, a desktop, a server, a mobile device, a smartphone, a processing unit, any combination of these devices, or any other suitable device having one or more processors. A user of a client device 102 uses various products, applications, or services supported by the animation system 108 via the data network 104.

Each of the client devices 102 are communicatively coupled to the animation system 108 via the data network 104. Examples of the data network 104 include, but are not limited to, internet, local area network ("LAN"), wireless area network, wired area network, wide area network, and the like.

In the example computing environment 100, the animation system 108 depicted in FIG. 1 executes the motion retargeting system 110 to generate retargeted motion for a target object in response to an input. In some cases, the animation system 108 outputs the retargeted motion to the requesting client device 102 or an additional computing system. In one example, outputting the retargeted motion includes encoding and transmitting the retargeted motion to the client device 102. In some examples, the animation system 108 encodes the retargeted motion in any suitable data format. In other examples, outputting the retargeted motion includes electronically storing the retargeted motion, such as, for example, on a memory associated with the computing environment 100.

The motion retargeting system 110 includes a machine-learning model that is trained using one or more suitable deep learning techniques. Examples of suitable deep learning techniques include techniques using a deep neural network ("DNN"), a feed-forward neural network ("FNN"), a multilayer perceptron ("MLP"), an RNN, long-short term memory network ("LSTM"), independent RNN (e.g., IndRNN), a convolutional neural network (e.g., a region convolutional neural network ("R-CNN"), Fast R-CNN, Faster R-CNN), or a deep residual network (e.g., ResNet-101, ResNeXt-101), etc. In some examples, the motion retargeting system 110 includes a generative adversarial network ("GAN") (e.g., BigGAN, LapGAN, MineGAN, StyleGAN), or a deep convolutional generative adversarial network ("DCGAN"). In some examples, the animation system 108 trains the motion retargeting system 110 using one or more of a source motion encoder 112, source motion decoder 114, and optimization engine 116.

In one example, training the motion retargeting system 110 includes obtaining pre-training data that includes animation data 118 for training, such as training source motion data, training target objects, training source objects, or additional training data. During training, the training source motion data is received by the contact-aware motion retargeting system 110, such as an input to the neural network 115. During training, the training source motion data is fed to source motion encoder 112. The source motion encoder 112 is trained to detect a source motion, such as one or more of a source skeleton motion or a source geometry motion. For instance, the source motion encoder 112 identifies locations of one or more points representing a skeleton of a particular training target object, such as points indicating locations or rotations of joints in the skeleton. In addition, the source motion encoder 112 identifies locations or one or more points representing a geometry (e.g., skin) of the particular training target object, such as points indicating vertices of triangles in the skin. During training, the source motion decoder 114 receives data from the source motion encoder 112, such as data describing the training source motion. In addition, the source motion decoder 114 is trained to generate data that describes the training source motion, such as hidden states. During training, the source motion decoder 114 generates data that describes the training source motion and training a target object, such as hidden states that describe relationships between the training source motion and locations of skeleton, skin, or other attributes of the training target object.

Example Processes for Contact-Aware Retargeting of Skinned Motion

Figure 2A:
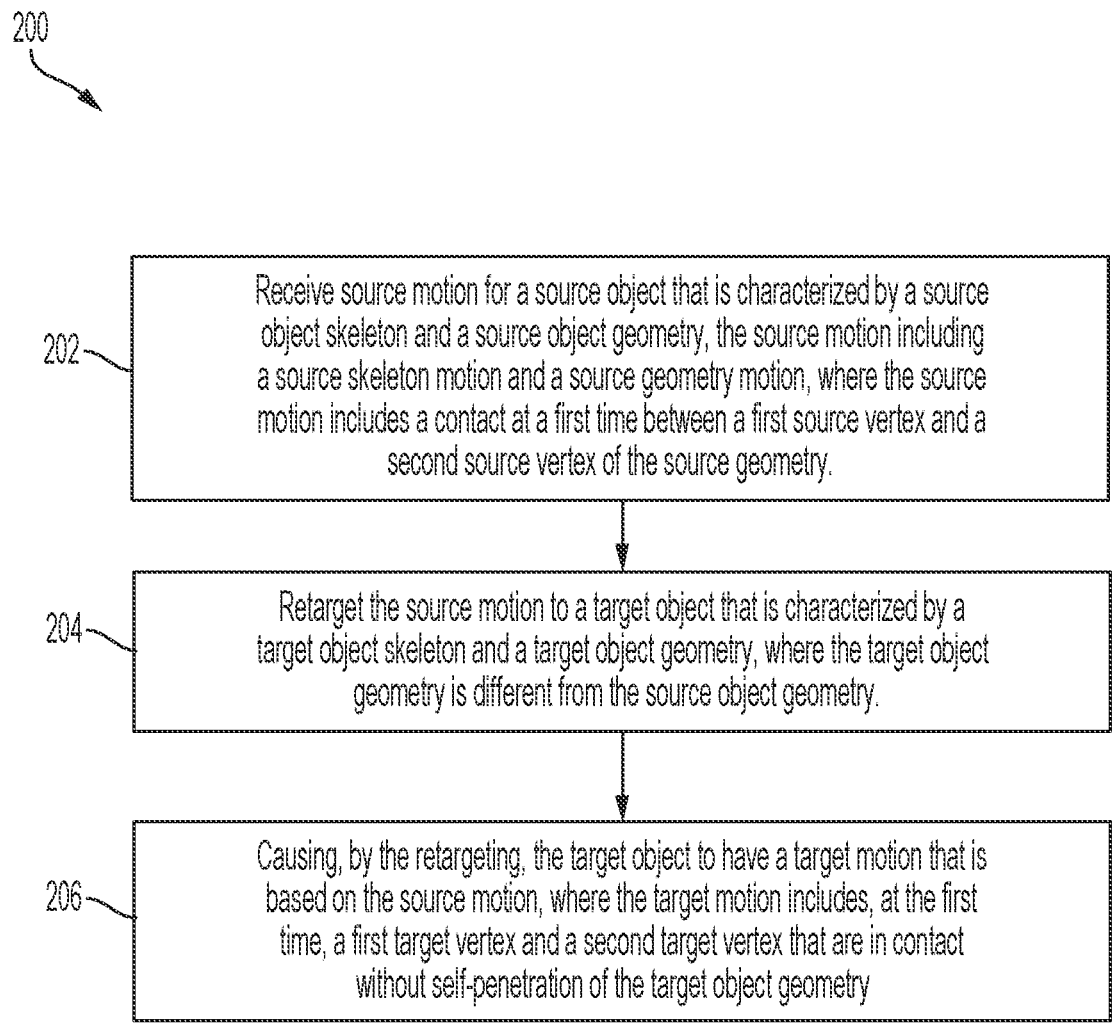
FIGS. 2A and 2B, depicts an example of a process for contact-aware motion retargeting, according to certain aspects of this disclosure.
Figure 2B:
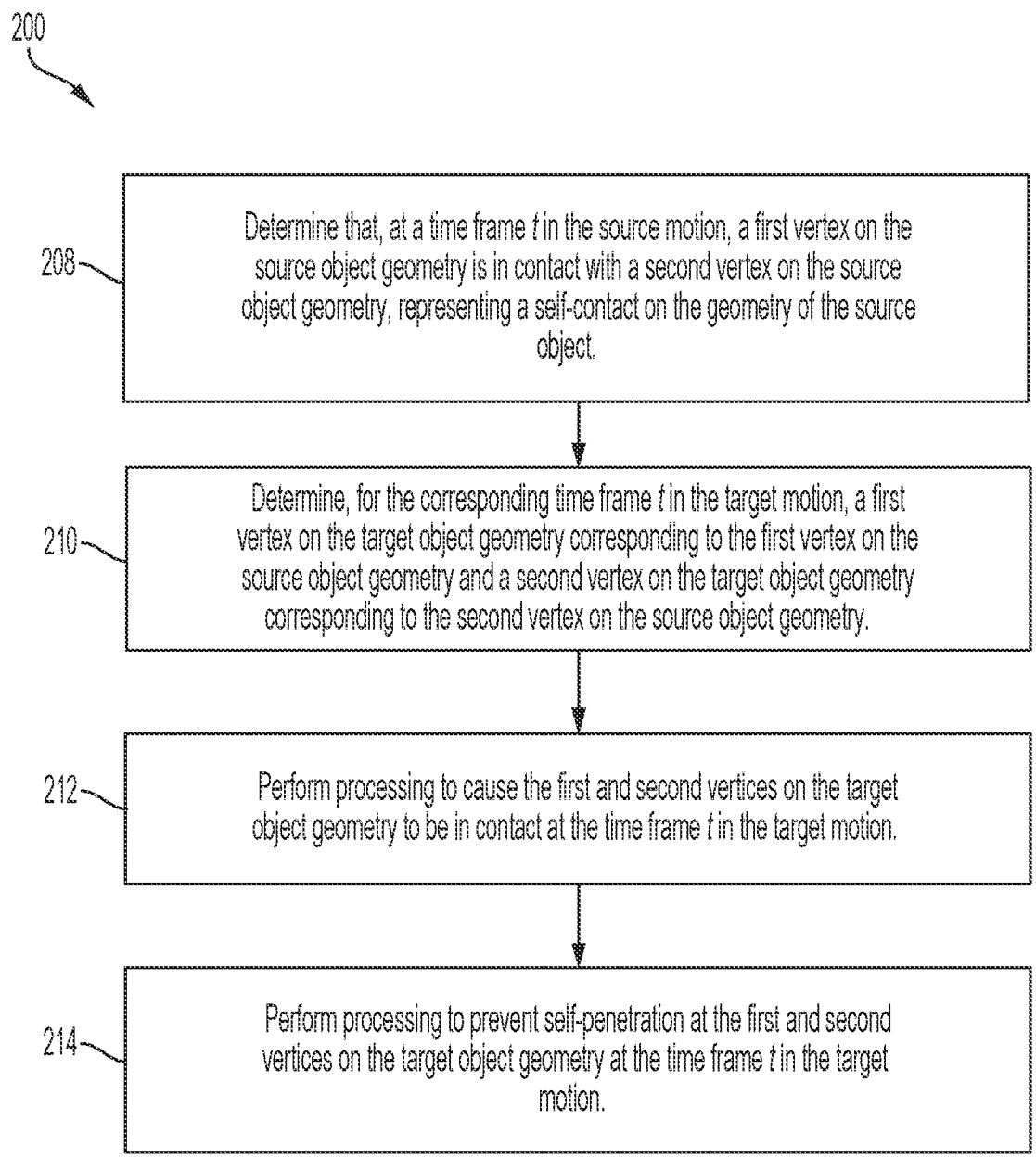

FIG. 2 includes FIG. 2A and FIG. 2B. FIG. 2 is an example of a process 200 for contact-aware retargeting of skinned motion, according to certain aspects of this disclosure. One or more operations described with respect to FIG. 2 are used to generate retargeted motion using an animation system (e.g., animation system 108). The animation system 108 executes a machine-learning model (e.g., contact-aware motion retargeting neural network 115) and the optimization engine 116 to generate retargeted motion according certain aspects discussed herein. One or more processing devices (e.g., in computing environment 100) implement operations depicted in FIG. 2 by executing suitable program code (e.g., motion retargeting system 110, self-contact detection engine 117, source motion encoder 112, source motion decoder 114, or optimization engine 116, etc.). For illustrative purposes, the process 200 is described with reference to certain examples depicted in the figures. Other implementations, however, are possible.

At block 202, the process 200 involves receiving a source motion for a source object. The source motion is over a time period, such as a sequence of time frames t−1, t, t+1, t+2, etc. The source object is characterized by a source object skeleton and a source object geometry, such as source skeleton data describing joints of the source object or source skin data describing skin vertices of the source object. In addition, the source motion includes a source skeleton motion and a source geometry motion. For instance, the source motion can include data describing positions, rotations, or velocities of one or more skeleton joints in the source object. In addition, the source motion can include data describing positions or relative positions of one or more skin vertices in the source object. The source motion includes a contact between a first source vertex in the source object geometry and a second source vertex in the source object geometry. In addition, the contact between the first source vertex and the second source vertex is at a first time in the time period, such as a particular time frame t. For example, the contact is a self-contact described by the source motion, such as a portion of the source motion during which the source object contacts different areas of the source geometry. Examples of self-contacts include, for instance, clapping hands, placing hands to hips, placing a hand to forehead.

In one example, the animation system 108 receives a source motion of a source object, as described in regards to block 202. The source motion, such as the source motion data 120, includes a contact between a first source vertex and a second source vertex in the source object geometry. For instance, the self-contact detection engine 117 detects the contact between the first and second source vertices based on the source motion data 120 and the source object 126.

At block 204, the process 200 involves retargeting the source motion to a target object. The target object is characterized by a target object skeleton and a target object geometry, such as target skeleton data or target skin data. In the process 200, the target object is different from the source object. For example, the target object geometry is different from the source object geometry, such as a target object geometry for a character that is large and heavyset as compared to a source object geometry of a character that is slim and bony. In some cases, the target object skeleton is different from the source object skeleton, such as a target object skeleton for a character that is small with short limbs as compared to a source object skeleton of a character that is tall with long limbs.

Continuing with the above example, the contact-aware motion retargeting system 110 retargets the source motion onto a target object, such as retargeting the source motion data 120 into the target object 122. The target object 122 is different, e.g., has different geometry data and/or skeleton data, from the source object 126 associated with the source motion data 120.

At block 206 of the process 200, the retargeting causes the target object to have a target motion that is based on the source motion. The target motion is over the time period, such as the time frames indicated by the source motion. In the target motion, at the first time in the time period, a first target vertex in the target object geometry and a second target vertex in the target object geometry are in contact. In some cases, the first target vertex corresponds to the first source vertex and the second target vertex corresponds to the second source vertex. In addition, the first target vertex and the second target vertex are in contact without self-penetration. For example, the contact between the first source vertex and the second source vertex is retargeted to the first target vertex and the second target vertex without the first target vertex or the second target vertex self-penetrating the target object geometry. A self-penetration includes, for example, an implausible interaction of an object geometry (or skeleton) in which a portion of a visual object is located within the geometry of the visual object. Examples of self-penetrations include, for instance, a hand passing into a torso of a character, or a foot moving through a leg of the character.

Continuing with the above example, the contact-aware motion retargeting system 110 retargets the source motion onto a target object while maintaining self-contacts and avoiding self-penetrations. For example, the retargeted motion data 124 retargets the source motion data 120 into the target object 122 while maintaining self-contacts described by the source motion data 120 and avoiding self-penetrations of the target object 122.

In some aspects, the process 200 includes one or more additional operations. For example, one or more operations describes in regards to blocks 208-214 can be implemented in addition to operations described in regards to blocks 202-206.

At block 208, the process 200 involves determining that the first source vertex is in contact with the second source vertex in the source object geometry. The contact between the first and second source vertices is associated with the particular time frame t. In addition, the contact between the first and second source vertices represents a self-contact of the source object geometry. For instance, the self-contact detection engine 117 detects the contact between the first and second source vertices based on the source motion data 120 and the source object 126. In some cases, the contact between the first and second source vertices is identified as a motion constraint, such as a self-contact constraint. In addition, the self-contact constraint may be received by a machine-learning model, such as the contact-aware motion retargeting neural network 115. An example technique to determine a pair of contacting vertices is a bounding volume hierarchy technique applied to triangles in the source object geometry, but other techniques may be used to identify pairs of contacting vertices.

At block 210, the process 200 involves determining that the first target vertex is in contact with the second target vertex. The contact between the first and second target vertices is associated with the particular time frame t, e.g., corresponding to the particular time frame t of the contact between the first and second source vertices. In some cases, the first target vertex corresponds to the first source vertex and the second target vertex corresponds to the second source vertex. For instance, the contact-aware motion retargeting neural network 115 determines that the first and second target vertices are in contact based on, for example, a self-contact constraint associated with the first and second source vertices.

At block 212, the process 200 involves performing processing to cause the first target vertex to be in contact with the second target vertex in the target motion at the particular time frame t. For example, the target object, as animated by the target motion, exhibits the same or similar self-contact as described by the object animated by the source motion. In some cases, a machine-learning model, such as the contact-aware motion retargeting neural network 115, performs one or more calculations to cause the first and second target vertices to be in contact in the target motion.

At block 214, the process 200 involves performing processing to prevent self-penetration of the target object geometry by the first target vertex or the second target vertex. In addition, self-penetration of the first and second target vertices is prevented in the target motion at the particular time frame t. For example, the target object, as animated by the target motion, avoids or reduces self-penetration while exhibiting the same or similar self-contact as described by the object animated by the source motion. In some cases, a machine-learning model, such as the contact-aware motion retargeting neural network 115, performs one or more calculations to prevent self-penetration of the first and second target vertices in the target motion.

Examples of Contact-Aware Retargeting of Skinned Motion

Figure 3:
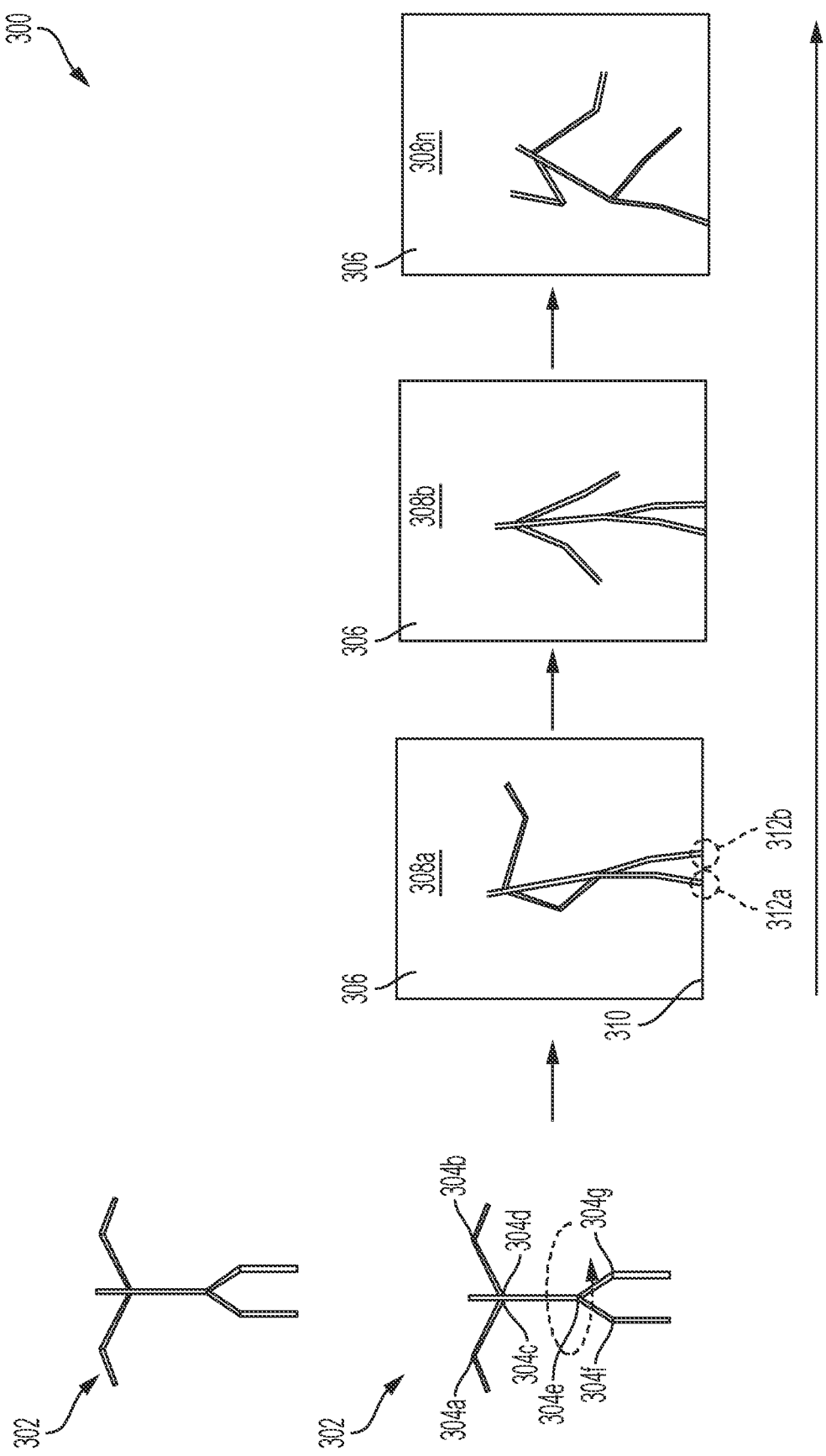
FIG. 3 depicts an example of a flow diagram for retargeting of a skeleton motion, according to certain aspects of this disclosure.

FIG. 3 depicts an example of a flow diagram 300 for retargeting of a skeleton motion by a contact-aware motion retargeting system, according to certain aspects of this disclosure. Techniques described in the flow diagram 300 can be implemented by the contact-aware motion retargeting system 110. The flow diagram 300 depicts a visual object in the form of an object skeleton 302, which represents a digital structure upon which a visual object is created. For instance, one or more of the source object 126 or the target object 122 are generated based on an object skeleton, such as the skeleton 302. The skeleton 302 includes multiple joints 304, including 304a, 304b, 304c, 304d, 304e, 304f, and 304g. The joints 304 connect different structural members (e.g., limbs, torso) of the skeleton 302. In some cases, the skeleton 302 is animated via retargeted motion, such as by source motion that is retargeted into the skeleton 302. For example, the skeleton 302 is animated by moving the skeleton translationally, such as translational movement (e.g., left/right, up/down) within a virtual environment of the skeleton 302. In addition, the skeleton 302 is animated by manipulating (e.g., translating, rotating) the joints 304. Among the joints 304 is a root joint 304e, which represents a reference position on the skeleton 302 that functions as a reference point for other joints 304 in the skeleton 302. For instance, motion of the skeleton 302 is characterized via movement of the joints 304 including the root joint 304e. As further detailed below, retargeting animation data includes characterizing velocity and/or rotation of the root joint 304e. An example of a root joint may be a hip joint, such as a hip joint on an object skeleton for a human (or humanoid) character depicted by the visual object. An additional example of a root joint may be a projected joint, such as a projection of a hip joint onto a ground surface in a virtual environment.

The flow diagram 300 further depicts the skeleton 302 positioned within a visual space 306 in which the skeleton 302 is animated. The visual space 306, for example, represents a virtual environment in which the skeleton 302 is positioned and in which animation of the skeleton 302 is depicted. Accordingly, the skeleton 302 is animated over a period of time that includes multiple time frames. Animation of the skeleton 302 includes different poses 308, including pose 308a, pose 308b, through pose 308n. Each particular pose of the poses 308 corresponds to a particular frame t from the multiple time frames, each frame representing a particular time during the period of time. In addition, the skeleton 302 is animated over the time frames t, such as by manipulating instances of the joints 304 between different positions. The animation, for instance, is generated via retargeted motion data according to techniques for motion retargeting with motion constraints described herein.

As part of animating the skeleton 302, the described techniques apply contact constraints on motion of the skeleton 302 to cause the animation to behave plausibly relative to the visual space 306, such as to plausibly simulate real-world physics in the visual space 306. For instance, in the different poses 308, the skeleton 302 makes contact with a ground surface 310 of the visual space 306 at contact points 312a, 312b. In some implementations, the contact points 312a and 312b are based on "end effectors" of the skeleton 302, such as feet, hands, or additional limbs (or portions of limbs) of the visual object represented by the skeleton 302.

In some cases, contact with the ground surface 310 represents a motion constraint on animation of the skeleton 302. For example, a contact point between an end effector and a ground surface is identified as a motion constraint, such as a foot-ground contact constraint identified by the self-contact detection engine 117. In some cases, applying one or more motion constraints, such as during generation of retargeted motion data, ensures that animation of the skeleton 302 visually resembles "real world" behaviors, such as contact with surfaces and/or objects in the visual space 306. Further, applying such motion constraints avoids other implausible visual behaviors, such as sliding across (e.g., "skating") or sinking into the ground surface 310. The ground surface 310 is discussed for purposes of example only, and it is to be appreciated that motion constraints are defined for a variety of different visual attributes of a visual space. Accordingly, the described techniques enforce such motion constraints to enable retargeted animations to avoid implausible visual artifacts.

Figure 4:
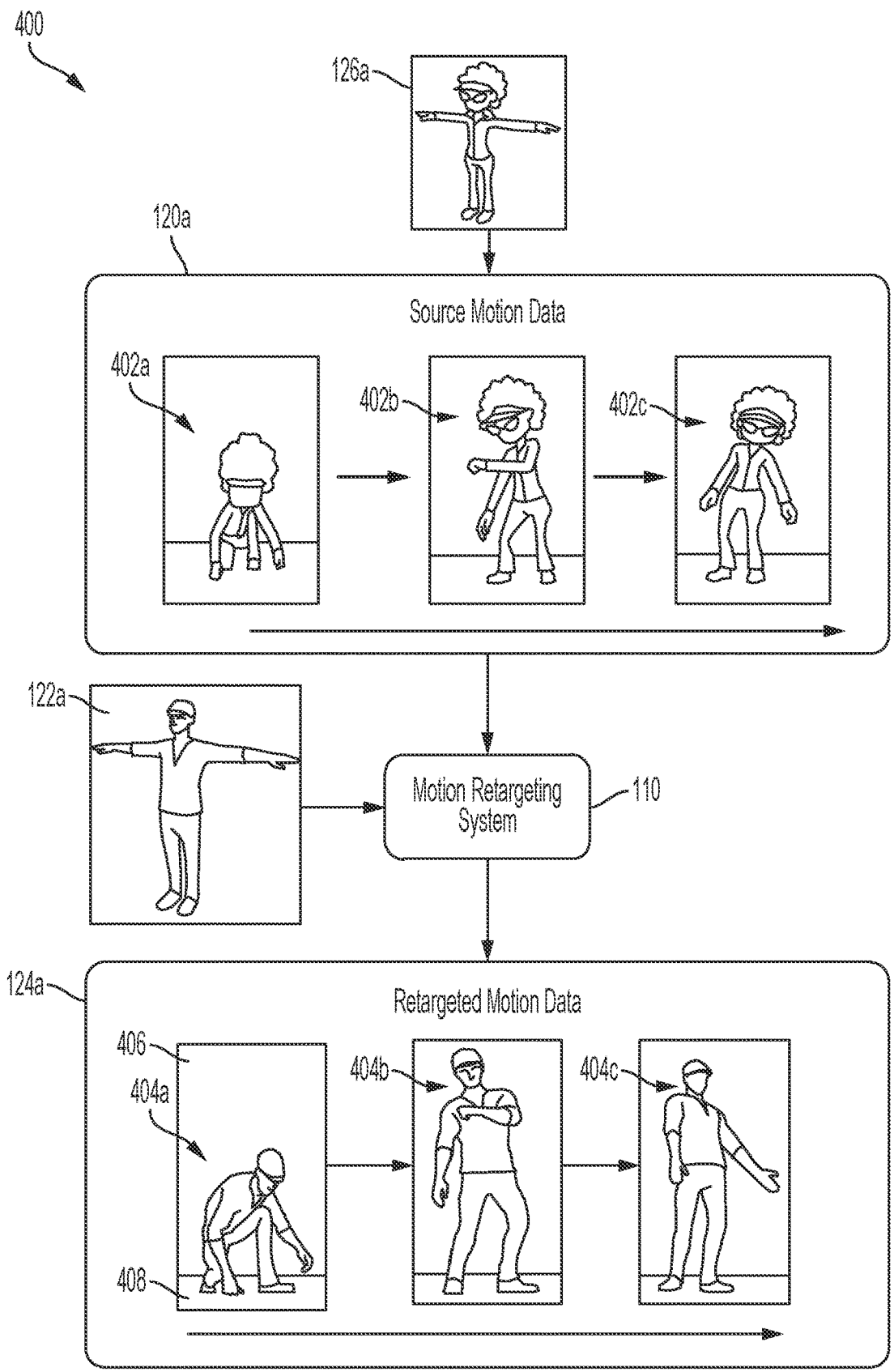
FIG. 4 depicts an example of a flow diagram for retargeting of a geometry motion, according to certain aspects of this disclosure.

FIG. 4 depicts an example of a flow diagram 400 for retargeting of a geometry motion by a contact-aware motion retargeting system, according to certain aspects of this disclosure. Techniques described in the flow diagram 400 can be implemented by the contact-aware motion retargeting system 110. For example, the contact-aware motion retargeting neural network 115 receives source motion data 120a and a target object 122a as inputs. In some cases, the source motion data 120a represents motion of a source object 126a. The source motion data 120a, the source object 126a, and the target object 122a are included, for example, in the animation data 118.

In some cases, the source motion data 120a includes (at least) a source pose 402a, a source pose 402b, and a source pose 402c. The source poses 402a-402c, for instance, represent respective positions of the source object 126a at respective time frames from the source motion data 120a. In at least one implementation, the source object 126a is generated based on a skeleton of a visual object, such as the skeleton 302.

In some cases, the contact-aware motion retargeting neural network 115 extracts features from one or more of the source motion data 120a or the target object 122a. In addition, the contact-aware motion retargeting neural network 115 generates retargeted motion data 124a based on the source motion data 120a and the target object 122a. The retargeted motion data 124a includes motion data that is retargeted into the target object 122a. The retargeted motion data 124a animates the target object 122a to simulate the source motion data 120a. In some cases, the retargeted motion data 124a is applied to animate a reference position of the target object 122a. The retargeted motion data 124a includes (at least) a target pose 404a, a target pose 404b, and a target pose 404c. The target poses 404a-404c represent respective positions of the target object 122a at respective time points from the retargeted motion data 124a. In some cases, each of the target poses 404a-404c simulates a respective source pose 402a-402c from the source motion data 120a.

In the flow diagram 400, the source motion data 120a can indicate a contact between the source object 126a and a ground surface (e.g., of a virtual environment). In some cases, a contact between the source object 126a and the ground surface represents a motion constraint. For example, the self-contact detection engine 117 identifies a foot-ground contact constraint or other motion constraints based on the source motion data 120a. In addition, the retargeted motion data 124a is generated based on one or more motion constraints, such as the contact between the source object 126a and the ground surface. In some cases, the retargeted motion data 124a places the target object 122a within a visual space 406. The visual space 406 includes a ground surface 408. Further, by applying motion constraints in motion retargeting, implausible visual behaviors are avoided, such as a target object with retargeted motion data 124a skating or sinking relative to the ground surface 408.

Figure 5:
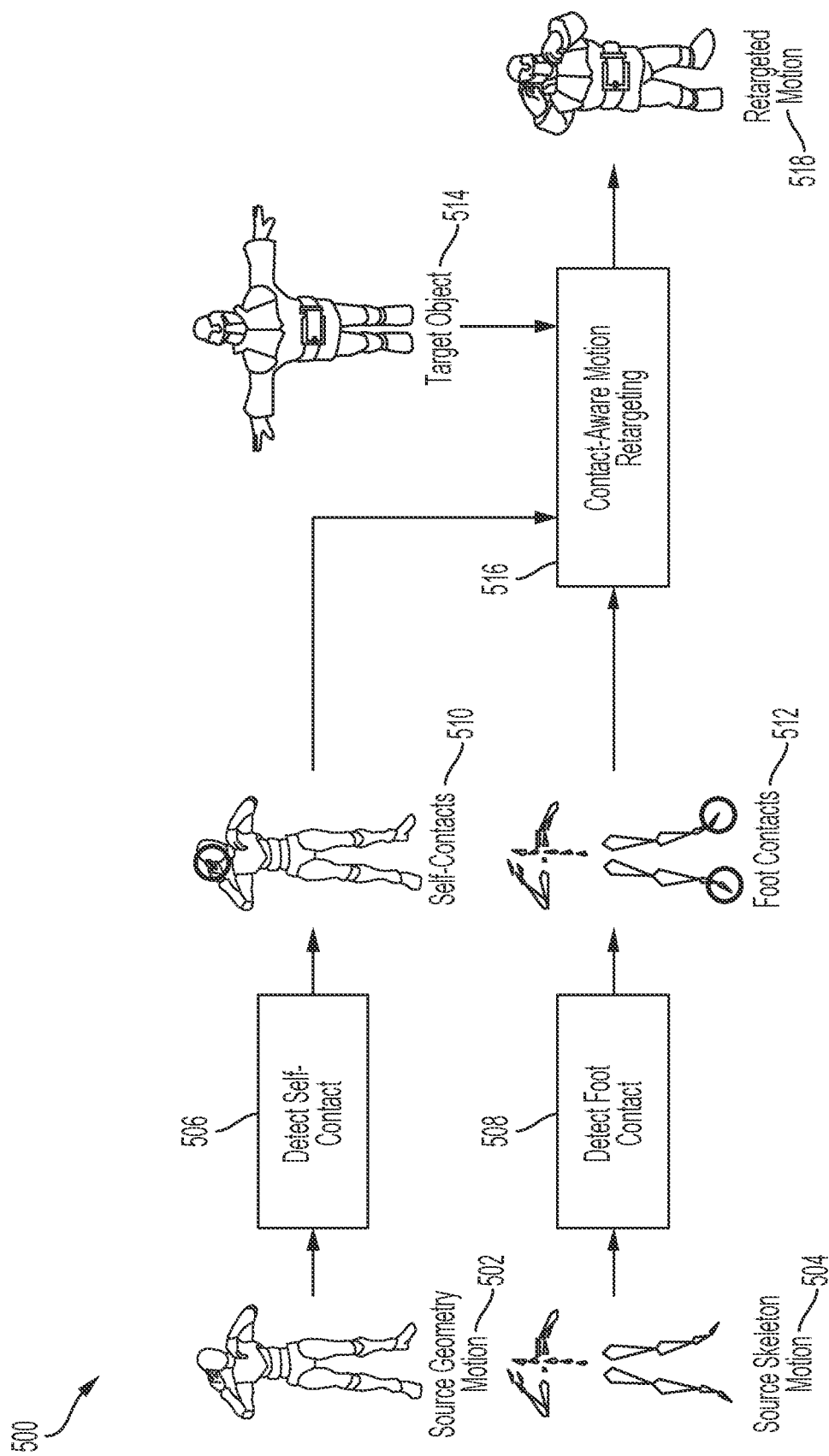
FIG. 5 depicts an example of a flow diagram for contact-aware motion retargeting, according to certain aspects of this disclosure.

FIG. 5 depicts an example of a flow diagram 500 for contact-aware motion retargeting, according to certain aspects of this disclosure. The flow diagram 500 depicts techniques that can be performed by the contact-aware motion retargeting system 110, which receives source motion data (e.g., source motion data 120 or 120a) and a target object (e.g., target object 122 or 122a) as inputs. In this example, the source motion data 120 represents motion of a source object 126. In FIG. 5, the source motion data 120 includes a source skeleton motion 504 that describes motion of joints for the source object 126. In addition, the source motion data 120 includes a source geometry motion 502 that describes motion of vertices for the source object 126, such as vertices describing a character geometry, e.g., skin, in the source object 126. Further, the target object 122 includes a target object 514 having a target geometry that is different from the geometry of the source object 126.

In FIG. 5, the contact-aware motion retargeting system 110 detects one or more self-contacts at step 506. For instance, the self-contact detection engine 117 identifies one or more self-contacts based on the source geometry motion 502. In addition, the self-contact detection engine 117 outputs one or more self-contacts 510. In FIG. 5, the self-contacts 510 include an example contact between vertices of the left hand and vertices of the head, e.g., at a particular time frame depicted in the source geometry motion 502.

In addition, the motion retargeting system 110 detects one or more foot contacts at step 508, such as foot-ground contacts or other contacts between skeleton joints and a ground surface. For instance, the self-contact detection engine 117 identifies one or more foot-ground contacts based on the source skeleton motion 504. The self-contact detection engine 117 outputs one or more foot contacts 512. In some examples, the foot contacts 512 include foot contacts with a ground surface that is described in the source motion data 120. For example, the foot contacts 512 include example contacts between joints of the left and right feet and a ground surface, e.g., at the particular time frame depicted in the source skeleton motion 504. FIG. 5 and other aspects described herein are described in regards to contacts between a foot and a ground surface, but other implementations are possible. For example, a contact-aware motion retargeting system can receive motion constraints related to contact between a ground surface and a hand, a wheel, a tail, or any other body component suitable for an animated character. In addition, a contact-aware motion retargeting system can receive motion constraints related to contact between a character's body component and a wall, a fluid surface (e.g., water), a hand-held object, or any other suitable object in a virtual environment.

In FIG. 5, the motion retargeting system 110 uses the self-contacts 510, the foot contacts 512, and the target object 514 to perform contact-aware motion retargeting at step 516. For instance, the contact-aware motion retargeting neural network 115 receives the self-contacts 510, the foot contacts 512, and the target object 514 as inputs. Based on the contact-aware motion retargeting, the motion retargeting system 110 outputs retargeted motion 518, such as motion retargeted into the target object 514. The retargeted motion 518 preserves the self-contacts 510 and foot contacts 512. In addition, the retargeted motion 518 avoids self-penetrations, e.g., of the target object 514 with itself.

In some examples, the inputs to the motion retargeting system 110 include a source motion that is represented as one or more of a source skeleton motion $m^A$ and a source geometry motion $\hat{v}^A$. In addition, the inputs to the motion retargeting system 110 include a target object represented by a target object skeleton $\bar{s}^B$ and a target object geometry $\bar{v}^B$. The target object skeleton $\bar{s}^B$ and the target object geometry $\bar{v}^B$ describe a reference pose (e.g., T-pose) of the target object. Based on the inputs, the motion retargeting system 110 outputs retargeted motion for the target object. The retargeted motion include a target skeleton motion $m^B$ and a target geometry motion $\hat{v}^B$. In addition, the retargeted motion preserves the "content" of the source motion (e.g., source motion data 120), including self-contacts 510 and foot contacts 512. In addition, the retargeted motion avoids introducing self-penetrations. The self-contacts 510 and foot contacts 512 in the source motion are automatically estimated by, for example, the self-contact detection step 506, such as by the self-contact detection engine 117.

In some examples, the contact-aware motion retargeting system 110 includes one or more machine-learning models (or sub-models) that satisfy one or more motion constraints. For example, the contact-aware motion retargeting neural network 115 includes machine-learning models such as an energy function, a geometry-conditioned RNN, or an encoder-space optimization function. For instance, the contact-aware motion retargeting neural network 115 uses the source motion data 120, such as the source skeleton motion $m^A$ and the source geometry motion $\hat{v}^A$, and the inferred contacts, such as the self-contacts 510 and foot contacts 512, to formulate an energy function that defines an output motion, e.g., a retargeted motion. In some cases, the energy function preserves self-contacts and reduces self-penetrations in the retargeted motion.

In some aspects, the contact-aware motion retargeting neural network 115 (or other components of the motion retargeting system 110) includes terms to preserve the source motion data 120. For example, the neural network 115 includes a full energy function, by which retargeted motion is generated. The full energy function includes terms for a target skeleton motion (e.g., having joint rotations, global trajectory, end-effector velocities, and foot contacts). In addition, the full energy function includes terms for a target geometry motion (e.g., having vertex locations). In some cases, the contact-aware motion retargeting neural network 115 includes a full energy function that is defined using Equation 1.

$$E_{full}(t) = E_{geo}(t) + E_{skel}(t) \qquad \text{Eq. (1)}$$

In Equation 1, $E_{geo}(t)$ represents a geometry-based motion modeling term that focuses on vertex contacts (e.g., a pair of input vertices) and self-penetrations. In addition, $E_{skel}(t)$ represents a skeleton-based motion modeling term that uses one or more contacts between the source object and a ground level. In Equation 1, the all energy function $E_{full}(t)$ is calculated as a sum of the geometry-based motion modeling term $E_{geo}(t)$ and the skeleton-based motion modeling term $E_{skel}(t)$. Further, the all energy function $E_{full}(t)$ is calculated for each frame t, such as for each frame in a video, an animated sequence, a continuous frame input, or other sets of frames that represent motion over time. In some cases, the full energy function $E_{full}(t)$ is optimized for each frame t, such as by an encoder-space optimization technique. For simplicity, the term t is omitted from expressions below. However, one or more of Equations 1-8 may be applied on a frame-wise basis, such as to each frame t in a set of frames.

The contact-aware motion retargeting neural network 115 is further configured to calculate geometry-level modeling terms. In some cases, modeling motion of a character geometry includes multiple objectives, such as modeling vertex contacts and reducing self-penetrations. In some cases, modeling vertex contacts alone can preserve contacts while also introducing large penetrations of the target geometry, such as a left hand going through a torso to touch a right arm. In contrast, completely avoiding all self-penetrations can cause meaningful contacts to be lost if they include slight self-penetrations. An example of losing meaningful contacts could be a source character that places its hands over its face, while an inappropriately retargeted character holds its hands a short distance away from its face. Thus, to achieve balance, a geometry-level modeling term can be calculated based on multiple objectives for modeling vertex contacts and reducing self-penetrations. In some cases, the contact-aware motion retargeting neural network 115 includes a geometry-level modeling energy function with multiple objectives, such as a geometry-level modeling energy function that is defined by Equation 2.

$$E_{geo} = \lambda E_{j2j} + \beta E_{int} + \gamma E_{foot} \quad \text{Eq. (2)}$$

In Equation 2, $E_{j2j}$ represents a self-contact preservation term, such as a joint-to-joint (e.g., "j2j") modeling term. In addition, $E_{int}$ represents a self-penetration (e.g., "interpenetration") reduction term. Further, $E_{foot}$ represents a foot contact modeling term. In Equation 2, the terms $\lambda$, $\beta$, and $\gamma$ represent respective weights for the $E_{j2j}$, $E_{int}$, and $E_{foot}$ modeling terms, such as weights that are determined by the neural network 115 during training. In addition, Equation 2 includes a geometry-based motion modeling term $E_{geo}$ that is calculated as a sum of the weighted terms $E_{j2j}$, $E_{int}$, and $E_{foot}$. In some cases, the term $E_{geo}$, as calculated via Equation 2, is used as a value for the geometry-based motion modeling term $E_{geo}(t)$ described in regards to Equation 1.

The contact-aware motion retargeting neural network 115 is further configured to calculate self-contact preservation terms. For instance, the neural network 115 receives, as inputs, a set of vertex contact constraints on the output motion for a particular time frame, identified during the self-contact detection step 506. The neural network 115 receives the set of vertex contact constraints from, for example, the self-contact detection engine 117. In some cases, the input is represented by a dataset $\mathcal{V} = \{(i,j)\}$ where a tuple (i,j) indicates that vertices $v_i$ and $v_j$ of the target geometry (e.g., a skin of the target object 514) should be in contact. In additional or alternative aspects, the set of vertex contact constraints is identified based on the source geometry motion $\hat{v}^A$. The self-contact preservation is measured as an average distance between such pairs of vertices, such as described by Equation 3.

$$E_{j2j} = \frac{1}{|\mathcal{V}|} \sum_{(i,j) \in \mathcal{V}} \|v_i - v_j\|^2 \quad \text{Eq. (3)}$$

In Equation 3, $E_{j2j}$ represents a self-contact preservation function that is calculated from an input set of vertex contact constraints represented by $\mathcal{V} = \{(i,j)\}$. In the input set of vertex contact constraints, a pair (i,j) represents a tuple that indicates where vertices $v_i$ and $v_j$ of the target object 514 should be in contact. In some cases, the term $E_{j2j}$, as calculated via Equation 3, is used as a value for the self-contact preservation term $E_{j2j}$ described in regards to Equation 2.

In addition, the contact-aware motion retargeting neural network 115 is configured to calculate self-penetration reduction terms. For example, the neural network 115 reduces occurrences of geometry penetrations using a penalty. In some cases, at each time step (e.g., time step for a frame t), the motion retargeting system 110 detects a set of colliding triangles $\mathcal{F} = \{(r,i)\}$ using a bounding volume hierarchy. For example, a tuple (r,i) indicates that triangles $f_r$ and $f_i$ of the target geometry are colliding (e.g., a triangle penetrates another triangle). The motion retargeting system 110 further defines a local distance field (e.g., a local 3D distance field) for each triangle in the form of a cone. For a pair of colliding triangles $f_r$ and $f_i$, the position of one triangle inside the local distance field of the other is used to determine a penetration term. In some cases, the contact-aware motion retargeting neural network 115 defines $E_{int}$ using Equation 4.

$$E_{int} = \Sigma_{(r,i) \in \mathcal{F}} (\Sigma_{v_k \in f_r} \mathcal{W}_{r,i} \|-\psi_i(v_j)n_j\|^2 + \Sigma_{v_k \in f_i} \mathcal{W}_{i,r} \|-\psi_r(v_k)n_k\|^2) \quad \text{Eq. (4)}$$

In Equation 4, $E_{int}$ represents a self-penetration reduction function that is defined by colliding triangles described by $\mathcal{F} = \{(r,i)\}$. For example, $f_r$ and $f_i$ represent a pair of colliding triangles. In addition, $v_j$ represents vertices in the triangle $f_r$, and $n_j$ represents per-vertex normals for the vertices $v_j$. Further, $v_k$ represents vertices in the triangle $f_i$, and $n_k$ represents per-vertex normals for the vertices $v_k$. In Equation 4, $\psi_i$ and $\psi_r$ describe respective distance fields for triangles i and r. The distance fields are positive for triangles that interpenetrate, and zero otherwise. In addition, weight factor $\mathcal{W}_{r,i}$ is calculated for triangle $f_r$ with respect to triangle $f_i$ and weight factor $\mathcal{W}_{i,r}$ is calculated for triangle $f_i$ with respect to triangle $f_r$. In some cases, the weights $\mathcal{W}_{r,i}$ and $\mathcal{W}_{i,r}$ are based on geodesic distance between the triangles $f_r$ and $f_i$. For example, the weights $\mathcal{W}_{r,i}$ and $\mathcal{W}_{i,r}$ may have a small value for triangles that are close together on the surface of the target object 514. Calculating the weights $\mathcal{W}_{r,i}$ and $\mathcal{W}_{i,r}$ based on geodesic distance between triangles can, for instance, permit relatively more self-penetrations in areas with smaller triangles (e.g., underarms, leg joints) and relatively fewer self-penetrations in areas with larger triangles (e.g., chest, back). In addition, calculating the weights $\mathcal{W}_{r,i}$ and $\mathcal{W}_{i,r}$ based on geodesic distance between triangles can produce retargeted motion with a more natural appearance, such as by permitting relatively more self-penetrations in areas with small or closely spaced triangles, such as at joints for walking. In some cases, the term $E_{int}$, as calculated via Equation 4, is used as a value for the self-penetration reduction term $E_{int}$ described in regards to Equation 2.

In addition, the contact-aware motion retargeting neural network 115 is configured to calculate foot contact modeling terms, For example, the neural network 115 receives, as input, foot-ground contacts that are identified in the source motion, such as the foot contacts 512. The neural network 115 receives the foot-ground contacts from, for example, the self-contact detection engine 117. In addition, the neural network 115 determines an energy term that preserves the foot-ground contacts by minimizing velocity and height for vertices that are in contact (e.g., as identified by the source motion data 120). In some cases, the contact-aware motion retargeting neural network 115 calculates a foot contact modeling term, for example, by Equation 5.

$$E_{foot} = \sum_{j \in C} \frac{1}{h^B} (\|\dot{g}_j^B\|^2 + \|(g_j^B)^y\|^2)$$ Eq. (5)

In Equation 5, $E_{foot}$ represents a foot contact modeling function that is calculated from an input set of foot contact constraints represented by a set C. In some cases the set C includes a set of toe and heel joints that are identified as being in contact with the ground at the foot contact detection step 508. For example, the input set of foot contact constraints are calculated by identifying toe or heel joints (e.g., from the source motion 120) that are within a threshold distance from the ground surface. The motion retargeting system 110 calculates a sum across multiple joints j that belong to the set C. In Equation 5, the term $\dot{g}_j^B$ indicates a global velocity of the joint j in the retargeted motion. In addition, the term $g_j^B$ indicates a global position of the joint j. Further, the term $h^B$ indicates a height of the object being retargeted (e.g., target object 514). The term y indicates a height coordinate (e.g., a y-coordinate in an xyz coordinate system) of the joint j. The global velocity, global joint position, and object height are described, for example, in terms of a virtual environment, such as a coordinate system of a virtual environment in which the target object is retargeted. For each joint j, a sum is calculated based on the global joint velocity $\dot{g}_j^B$, the global joint position $g_j^B$, and the y coordinate of the joint j. In some cases, the term $E_{foot}$, as calculated via Equation 5, is used as a value for the foot contact modeling term $E_{foot}$ described in regards to Equation 2.

The contact-aware motion retargeting neural network 115 is further configured to calculate skeleton-level modeling terms. In some cases, modeling motion of a target object skeleton includes multiple objectives, such as modeling local motion represented as joint rotations, global motion represented as a trajectory of a root joint (e.g., a hip joint), and global motion of one or more end-effectors (e.g., hands, feet). For instance, modeling joint rotations can cause joints of the target object (e.g., target object 514) to exhibit motion similar to joints of the source motion (e.g., source motion data 120). In addition, modeling global motion of a root joint and end effectors can cause the target object to follow a global trajectory similar to the source motion, In some cases, global motion refers to overall motion of an animated character within a simulated environment. In some cases, the contact-aware motion retargeting neural network 115 calculates a skeleton-level modeling energy function, such as a skeleton-level modeling energy function that is defined by Equation 6.

$$E_{skel} = E_{weak} + \omega E_{33}$$ Eq. (6)

In Equation 6, $E_{weak}$ represents a motion modeling term for local and global motion, such as a weakly supervised modeling term. In addition, $E_{ee}$ represents a motion modeling term fix end-effector positions, such as positions of hand joints or foot joints. In Equation 6, the term $\omega$ represents a weight for the $E_{ee}$ modeling term, such as a weight that is determined via one or more machine-learning models included in the motion retargeting system 110. In addition, Equation 6 includes a skeleton-based motion modeling term $E_{skel}$ that is calculated as a sum of the weighted terms $E_{weak}$ and $E_{ee}$. In some cases, the term $E_{skel}$, as calculated via Equation 6, is used as a value for the skeleton-based motion modeling term $E_{skel}(t)$ described in regards to Equation 1.

The contact-aware motion retargeting neural network 115 is further configured to calculate weakly supervised modeling terms. For instance, the motion retargeting system 110 receives a set of multiple joints described by a source object, such as all joints included in a character described by the source motion data 120. Based on the set of joints, the neural network 115 uses a weakly supervised energy function, such as described by Equation 7, to calculate a modeling term for one or more of local motion or global motion.

$$E_{weak} = \rho \sum_j \|\theta_j^B - \theta_j^A\|^2 + \|o^B - o^{A \to B}\|^2$$ Eq. (7)

In Equation 7, $E_{weak}$ represents a weakly supervised motion modeling function that is calculated from an input set of joints describing motion of a source object, such as joints described in the skeleton motion 504. Each joint j in the input set of source joints has an associated source rotation $\theta_j^A$ that describes rotation of the joint j in the source motion (e.g., source motion data 120). In Equation 7, for each joint j, a difference is calculated between the source rotation $\theta_j^A$ and a retargeted rotation $\theta_j^B$ that describes rotation of the joint j in the retargeted motion (e.g., retargeted motion 518). Based on the rotation differences, a sum is calculated across all joints j in the input set of joints. In Equation 7, the term $\rho$ represents a weight for the sum of the joint rotation differences, such as a weight that is determined by the contact-aware motion retargeting neural network 115 during training.

In addition, the source motion describes a root velocity $o^A$ that indicates a velocity of a root joint (e.g., a hip joint) of the source object. In Equation 7, a scaled source root velocity $o^{A \to B}$ is calculated based on a height ratio between legs of the source object and legs of the target object. In addition, the contact-aware motion retargeting neural network 115 calculates a retargeted root velocity of $o^B$ that indicates a velocity of a root joint in the retargeted motion. A difference is calculated between the retargeted root velocity $o^B$ and the scaled source root velocity $o^{A \to B}$. In Equation 7, $E_{weak}$ is calculated based on the root velocity difference and the sum of the joint rotation differences. In some cases, the term $E_{weak}$, as calculated via Equation 7, is used as a value for the local and global motion modeling term $E_{weak}$ described in regards to Equation 6.

The contact-aware motion retargeting neural network 115 is further configured to calculate end-effector modeling terms. For instance, based on the input set of joints described by a source object, such as all joints included in a character described by the source motion data 120, the neural network 115 calculates a position of one or more end-effectors, such as hand or feet. In some cases, the neural network 115 calculates an end-effector modeling term using an energy function, such as an end-effector function described by Equation 8.

$$E_{ee} = \sum_{j \in ee} \left\| \frac{1}{h^B} \dot{g}_j^B - \frac{1}{h^A} \dot{g}_j^A \right\|^2$$ Eq. (8)

In Equation 8, $E_{ee}$ represents an end-effector modeling function that is calculated from an input set of joints describing end-effectors that are represented by a set ee. The set of end-effector joints ee are identified, for instance, from joints describing motion of a source object, such as joints described in the source motion data 120. In some cases, the source motion describes a height $h^A$ that indicates a height of the source object. In addition, each joint j in the end-effector joints ee has an associated velocity $\dot{g}_j^A$ that describes a global velocity of the joint j in the source motion. In Equation 8, the term $h^B$ indicates a height of the target object being retargeted (e.g., target object 514), and the term $\dot{g}_j^B$ indicates a global velocity of the joint j in the retargeted motion (e.g., retargeted motion 518). Based on Equation 8, the contact-aware motion retargeting neural network 115 calculates the end-effector modeling term $E_{ee}$ by minimizing a difference between the global velocities of end-effector joints in the source and target object, scaled by the respective object heights $h^A$ and $h^B$. For example, for each joint j, the retargeted velocity $\dot{g}_j^B$ is scaled by the target object height $h^B$. In addition, for each joint j, the source velocity $\dot{g}_j^A$ is scaled by the source object height $h^A$. In Equation 8, a difference is calculated, for each joint j, between the scaled retargeted velocity and the scaled source velocity. Based on the differences of the scaled velocities, a sum is calculated across all joints j in the end-effector joints ee. In some cases, the term $E_{ee}$, as calculated via Equation 8, is used as a value for the end-effector position modeling term $E_{ee}$ described in regards to Equation 6.

Figure 6:
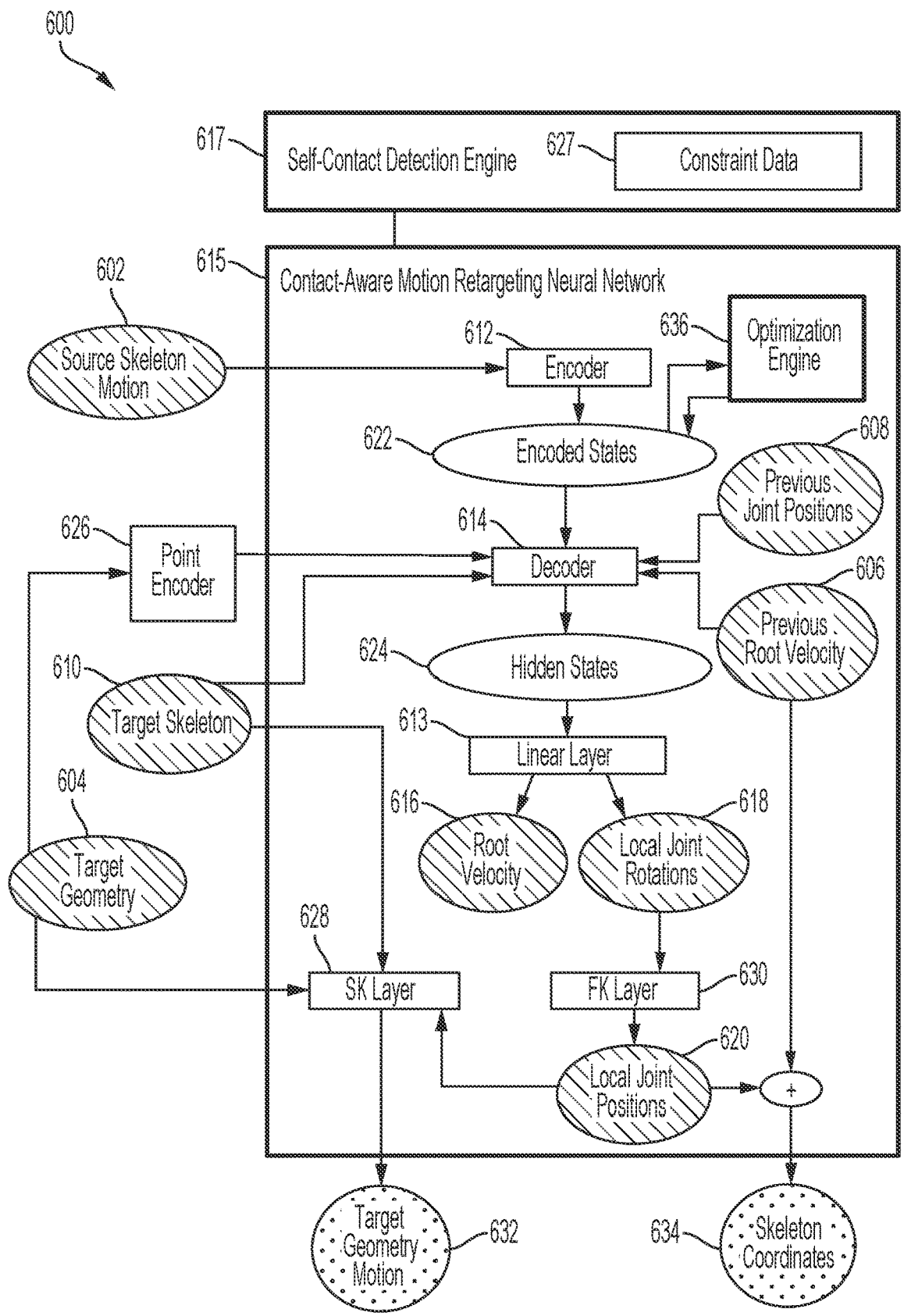
FIG. 6 depicts example of a block diagram for a contact-aware motion retargeting neural network, according to certain aspects of this disclosure.

FIG. 6 depicts a diagram of an example architecture 600 of one or more components that are configured for contact-aware motion retargeting, according to certain aspects of this disclosure. In some cases, the contact-aware motion retargeting system 110 implements one or more components using the architecture 600. In addition, the architecture 600 utilizes one or more of the Equations 1-8, such as by training components of the architecture 600 to calculate a full energy function, a geometry-based motion modeling term, a skeleton-based motion modeling term, or other terms or functions described herein.

The architecture 600 includes, for example, a contact-aware motion retargeting neural network 615 that is configured to retarget motion of a source object to a target object, such as an animated character. The neural network 615 is configured to generate retargeted motion by minimizing an energy function, such as described in regards to Equation 1. In some cases, the neural network 615 is an RNN. The architecture 600 includes one or more of an encoder 612, a decoder 614, a skinning ("SK") layer 628, or a forward kinematics ("FK") layer 630. In some cases, the neural network 615 includes one or more optimization engines, such as an optimization engine 636. In additional or alternative aspects, the architecture 600 includes one or more optimization engines that are external to the neural network 615. The neural network 615 can be configured to receive data from (or provide data to) the one or more external optimization engines.

In addition, the architecture 600 includes, for example, a self-contact detection engine 617 that is configured to identify one or more motion constraints on the retargeted motion. The self-contact detection engine 617 identifies, for instance, one or more self-contact constraints, such as vertex contact constraints described in regards to Equation 3. In addition, the self-contact detection engine 617 identifies one or more foot contact constraints, such as foot-ground contacts described in regards to Equation 5. In some cases, the self-contact detection engine 617 generates constraint data 627 that describes the motion constraints. In addition, the neural network 615 receives (or otherwise accesses) the constraint data when generating retargeted motion.

In the architecture 600, the contact-aware motion retargeting neural network 615 receives a source skeleton motion 602, a target geometry 604, and a target skeleton 610. The source skeleton motion 602, target geometry 604, and target skeleton 610 respectively correspond to the source skeleton motion $m^A$, target geometry $\overline{v}^B$, and target skeleton $\overline{s}^B$ described in regards to FIG. 5. In some cases, the source skeleton motion 602 is associated with a time frame, such as a frame t described in regards to Equation 1. In regards to FIG. 6, the frame t is referred to as the present time frame, a frame t−1 is referred to as the previous time frame, and a frame t+1 is referred to as the subsequent time frame. FIG. 6 uses this nomenclature for convenience, not by way of limitation, and it is to be understood that one or more additional time frames (e.g., frame t−2, frame t+2, etc.) may be included in a source motion. In some cases, the constraint data 627 identifies motion constraints that are associated with the source skeleton motion 602, the target geometry 604, or the target skeleton 610. In addition, the constraint data 627 indicates a time frame associated with a particular motion constraint. For example, the self-contact detection engine 617 identifies, based on the source skeleton motion 602, a first self-contact constraint at a particular time frame (e.g., hand on head) and a second self-contact constraint at an additional time frame (e.g., hand on hip). The constraint data 627 describes the first and second self-contact constraints, and the respective time frames at which first and second self-contact constraints occur.

The encoder 612 receives as an input the source skeleton motion 602, such as the source skeleton motion 504. In addition, the encoder 612 encodes the source skeleton motion 602 into encoded states 622, such as encoded states $h^{enc}$. For example, the encoded states 622 describe motion features of the source skeleton motion 602 at the present time frame t. In some cases, the encoded states 622 are optimized. For example, the optimizer engine 636 performs a quantity (e.g., N=30) of iterative gradient descent updates to hidden encoding units of the encoded states 622. In some cases, the optimizer engine 636 optimizes respective encoded states 622 for each time frame of the source skeleton motion 602, such as optimized encoded states 622 for the present frame t, additional optimized encoded states for the previous frame t−1, or yet additional optimized encoded states for additional time frames.

The decoder 614 receives as an input the encoded states 622 (including, for example, the optimized encoded states 622). In addition, the decoder 614 receives as an input the target skeleton geometry 610 that describes a skeleton of the target object. The decoder 614 also receives as inputs data that describe motion of the target object at a previous frame (e.g., frame t−1), such as previous joint positions 608 and previous root velocity 606. In some cases, the previous joint positions 608 and previous root velocity 606 are received from within the neural network 615, such as data that is stored from a previous analysis of a previous time frame. For example, each of the previous joint positions 608 and the previous root velocity 606 are associated with the previous frame t−1.

In some cases, the decoder 614 receives, as input, data from a point encoder 626 that is included in the architecture 600. The point encoder 626 provides to the decoder 614 data describing geometric encoding of the target object. For example, the point encoder 626 receives a target geometry 604 of the target object, such as target object geometry $\overline{v}^B$ described in regards to FIG. 5. Based on the target geometry 604, the point encoder 626 calculates a geometric encoding of the target object, such as geometric encoding based on geometry and skinning weights of the target character in reference pose (e.g., T-pose). In some implementations, providing a geometric encoding of a target object as an input to the decoder 614 enables the architecture 600 to be invariant to the topology of the target object geometry 604.

Based on the received inputs, the decoder 614 decodes motion features, such as motion features of the target object with the applied source motion. The decoder 614 generates hidden states 624, such as hidden states $h^{dec}$, which describe the decoded motion features. In addition, the hidden states 624 are associated with the present time frame t, such as the decoded motion features of the target object at the present time frame t. In some cases, the decoder 614 generates the hidden states 624 that are consistent with one or more motion constraints. For example, the contact-aware motion retargeting neural network 615 receives the constraint data 627 (or a portion of the data 627) that describes motion constraints associated with the present time frame t, such as a self-contact vertex pair or a foot-ground contact. In some cases, the neural network 615 receives the motion constraints from a contact detection engine, such as the self-contact detection engine 617. In addition, the decoder 614 calculates one or more values consistent with the received motion constraints, such as calculation of a self-contact preservation function, a self-penetration reduction function, or a foot contact modeling function as described in regards to Equations 3-5.

In some cases, the hidden states 624 are used to calculate retargeted motion of the target object. The retargeted motion includes a target skeleton motion and a target geometry motion that respectively correspond, for instance, to the target skeleton motion $m^B$ and target geometry motion $\hat{v}^B$ described in regards to FIG. 5. The target skeleton motion is described by one or more of joint positions, joint rotations, skeleton coordinates, or a root velocity. For example, one or more linear layers, such as a linear layer 613, receive the hidden states 624 as an input. FIG. 6 depicts the linear layer 613 as being subsequent to the decoder 614, but other implementations are possible, such as one or more linear layers being included in the decoder 614.

Based on the hidden states 624, the linear layer 613 decodes a root velocity 616 and local joint rotations 618 for the target object, such as the retargeted root velocity $o^B$ and the retargeted rotation $\theta_j^B$ described in regards to Equation 7. Each of the root velocity 616 and the local joint rotations 618 are associated with the present time frame t. In some cases, one or more of the root velocity 616 or the local joint rotations 618 are stored by the neural network 615, such as for use in a subsequent time frame t+1. For example, the root velocity 616 for the present time frame t is provided to the decoder 614 as an input for calculating hidden states for the subsequent time frame t+1 (e.g., such as described regarding the previous root velocity 606).

In some cases, the root velocity 616 is optimized. For example, the optimizer engine 636 (or an additional optimizer engine) performs a quantity (e.g., N=30) of iterative gradient descent updates to the root velocity 616. In some cases, the optimizer engine 636 optimizes a respective root velocity 616 for each time frame of the source skeleton motion 602, such as an optimized root velocity 616 for the present frame t, an additional optimized root velocity for the previous frame t−1, or yet additional optimized root velocities for additional time frames. In some cases, the root velocity provided to the decoder 614 for the subsequent time frame t+1 (e.g., such as described regarding the previous root velocity 606) is an optimized root velocity.

In the architecture 600, the FK layer 630 receives the local joint rotations 618 as an input. Based on the local joint rotations 618, the FK layer 630 calculates local joint positions 620. The local joint positions 620 describe the positions (e.g., coordinates) of the joints in the target object at the present time frame t. In some cases, the local joint positions 620 are stored by the neural network 615, such as for use in a subsequent time frame t+1. For example, the local joint positions 620 for the present time frame t are provided to the decoder 614 as an input for calculating hidden states for the subsequent time frame t+1 (e.g., such as described regarding the previous joint positions 608).

In some cases, some or all of the local joint positions 620 are described with regards to other local joint positions, such as an elbow joint described in relation to a shoulder joint. In addition, some or all of the local joint positions 620 are described with regards to positions at other time frames, such as a particular joint at the present time frame t being described in relation to the particular joint at the previous time frame t−1.

In the architecture 600, the local joint positions 620 are combined with a root velocity of the target object. For example, the local joint positions 620 are combined with the previous root velocity 606 of the previous time frame t−1. Based on the combination of the local joint positions 620 and the previous root velocity 606, the architecture 600 generates skeleton coordinates 634. The skeleton coordinates 634 describe, for example, joint coordinates with the retargeted motion for the target object (e.g., joint coordinates for retargeted motion 518). In some cases, the skeleton coordinates 634 describe global joint positions (e.g., coordinates) at the present time frame t, such as the global joint positions $g_j^B$ described in regards to Equation 5. In some cases, the skeleton coordinates 634 are provided as an output (or portion of an output) of the architecture 600, such as output data included in the target skeleton motion $m^B$ or the retargeted motion data 124.

In the architecture 600, the SK layer 628 receives the local joint positions 620 as an input. In addition, the SK layer 628 receives the target skeleton 610 and the target geometry 604 of the target object. Based on the local joint positions 620, target skeleton 610, and target geometry 604, the SK layer 628 calculates target geometry motion 632 for the target object, such as target geometry motion $\hat{v}^B$ described in regards to FIG. 5. The target geometry motion 632 describes, for example, positions of vertices in the geometry of the target object, such as the set of target geometry vertices $\mathcal{V}$ described in regards to Equations 3 and 4. In addition, the target geometry motion 632 describes geometry vertex coordinates with the retargeted motion for the target object (e.g., coordinates in the retargeted motion 518). In some cases, the target geometry motion 632 describes global geometry positions (e.g., coordinates) at the present time frame t. In some cases, the target geometry motion 632 is provided as an output (or portion of an output) of the architecture 600, such as output data included in the target skeleton motion $m^B$ or the retargeted motion data 124.

In some implementations, the optimizer engine 636 optimizes one or more portions of the architecture 600. For example, the optimizer engine 636 can use an encoder-space optimization technique. The optimization occurs subsequent to training, such as during testing or operation (e.g., "live" operation) of the architecture 600.

In some cases, encoder-space optimization of the architecture 600 includes updating output motion data (e.g., target skinned motion 632, skeleton coordinates 634) by updating one or more of the encoded states 622 or root velocity 616 generated by the architecture 600. For example, for each iteration of the optimization, the optimized encoded states 622 are provided to the decoder 614, enabling the decoder 614 to generate the hidden states 624 based on the optimized encoded states 622. In some cases, optimization of the architecture 600 includes performing a quantity (e.g., N=30) of iterative gradient descent updates to the root velocity 616 or hidden encoding units of the encoded states 622. For each iteration, the gradient descent updates calculate terms of the full energy function $E_{full}(t)$ (e.g., described in regards to Equations 1-8) that include data for a present time frame t. In addition, the gradient descent updates avoid calculating terms of the full energy function $E_{full}(t)$ that include data for previous time frames t−1, t−2, etc. In some cases, optimization of the architecture 600 allows more efficient updates of frame-by-frame motion, while also taking advantage of smooth, low-dimensional, decoupled embedding learned by the architecture 600.

Figure 7A:
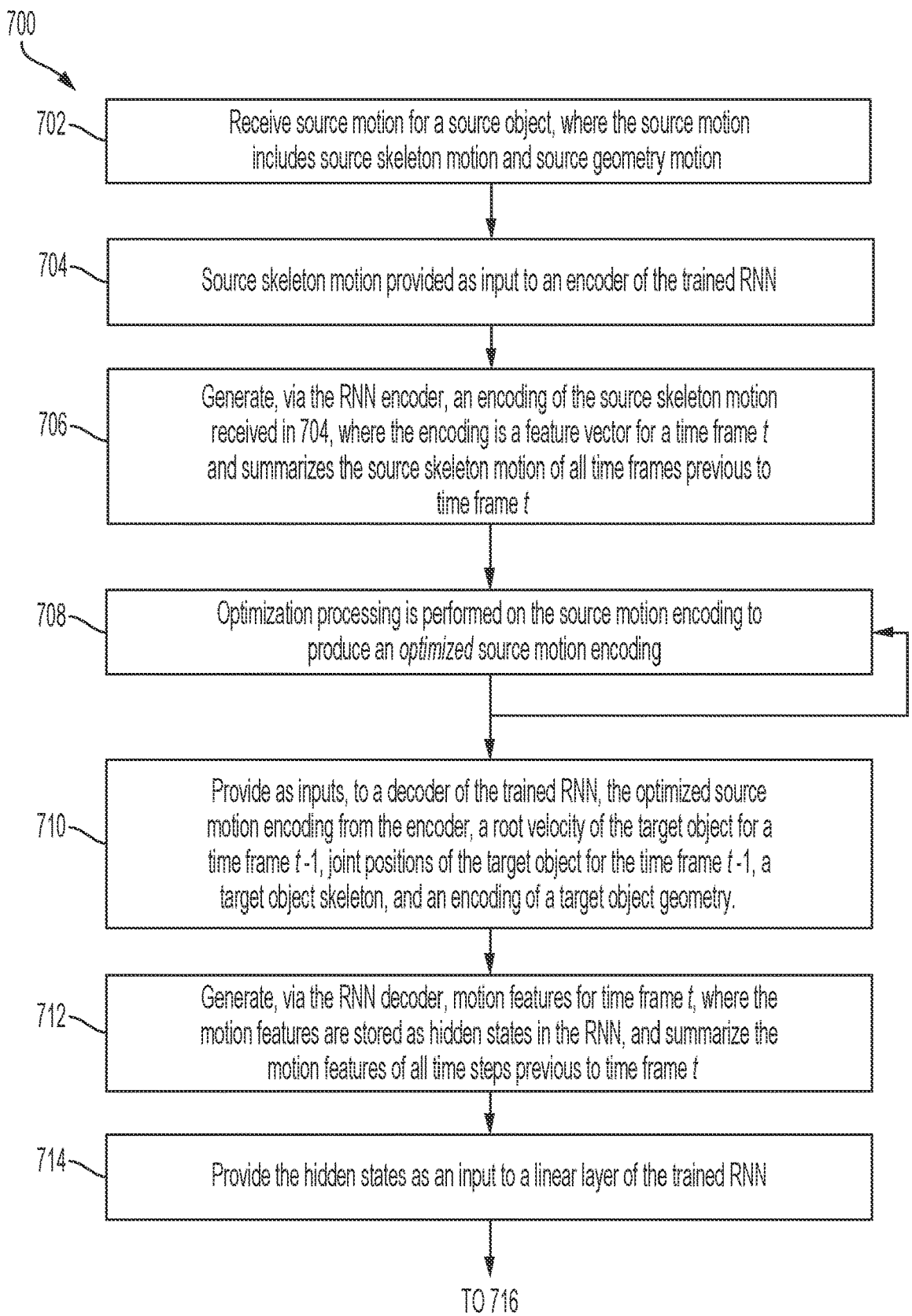
FIGS. 7A and 7B, depicts an example of a process implemented via a contact-aware motion retargeting neural network, according to certain aspects of this disclosure.
Figure 7B:
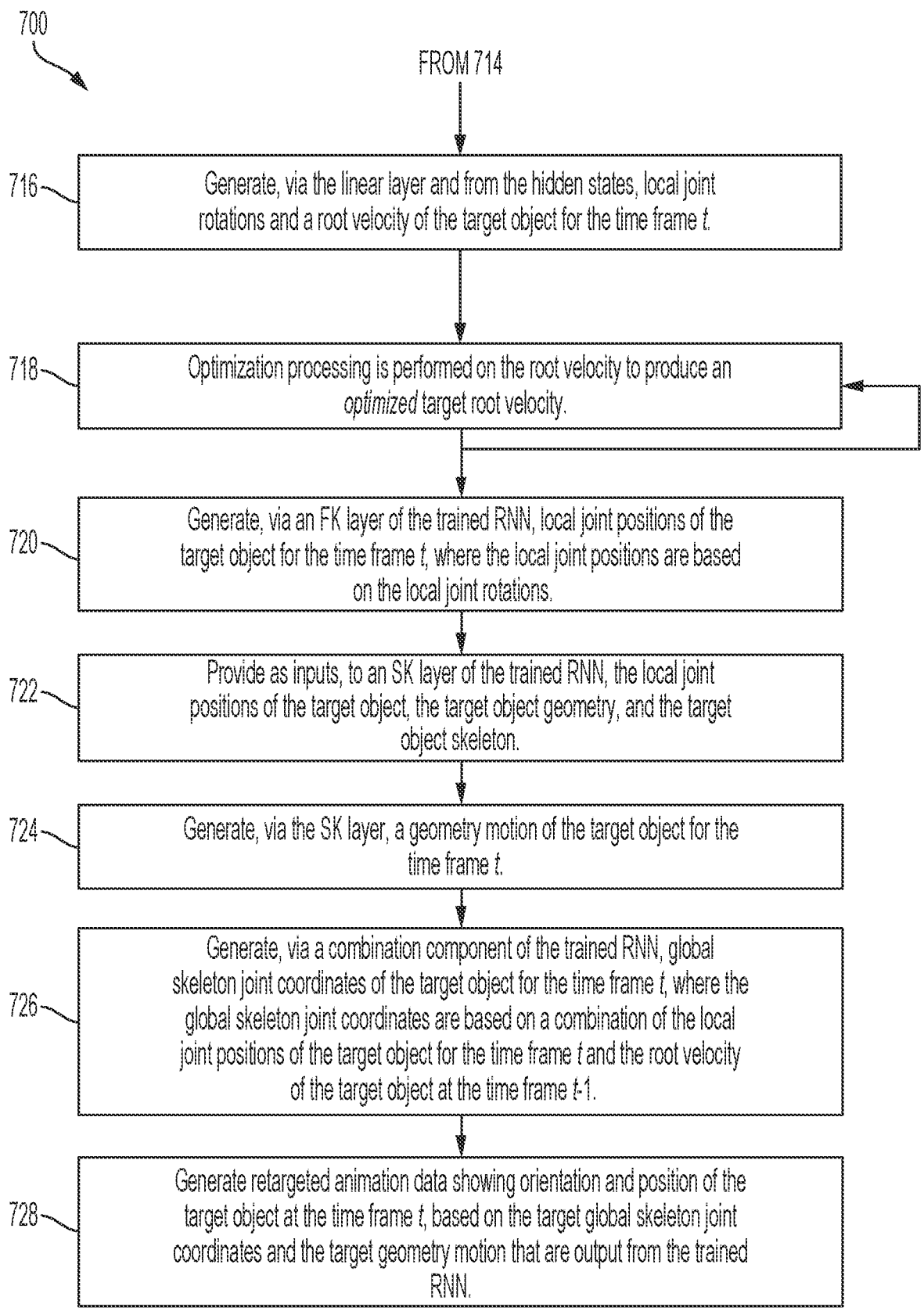

FIG. 7 includes FIG. 7A and FIG. 7B. FIG. 7 is an example of a process 700 for contact-aware motion retargeting, according to certain aspects of this disclosure. One or more operations described with respect to FIG. 7 are used to generate retargeted motion using a contact-aware motion retargeting neural network (e.g., contact-aware motion retargeting neural network 115, contact-aware motion retargeting neural network 615). The contact-aware motion retargeting neural network executes one or more machine-learning models (e.g., encoder 621, decoder 614) and an optimization engine (e.g., optimization engine 116, optimization engine 636) to generate retargeted motion according certain aspects discussed herein. One or more processing devices (e.g., in the computing environment 100) implement operations depicted in FIG. 7 by executing suitable program code (e.g., motion retargeting system 110, neural network 615, optimization engine 636, etc.). For illustrative purposes, the process 700 is described with reference to certain examples depicted in the figures. Other implementations, however, are possible.

At block 702, the process 700 involves receiving a source motion for a source object. The source motion includes a source skeleton motion, such as the source skeleton motion 602. In some cases, the source motion includes a source geometry motion. The source motion is over a time period, such as a sequence of time frames t−1, t, t+1, t+2, etc. In regards to FIG. 7, the frame t is referred to as the present time frame, a frame t−1 is referred to as the previous time frame, and a frame t+1 is referred to as the subsequent time frame. FIG. 7 uses this nomenclature for convenience, not by way of limitation, and it is to be understood that one or more additional time frames (e.g., frame t−2, frame t+2, etc.) may be included in a source motion.

At block 704, the process 700 involves providing the source skeleton motion as an input to an encoder in a trained RNN. For example, the encoder 612 receives the source skeleton motion 602. The encoder receives the source skeleton motion associated with the present time frame t.

At block 706, the process 700 involves generating an encoding of the source skeleton motion received at block 704. For instance, the encoder encodes the source skeleton motion into encoded states $h^{enc}$, such as the encoded states 622. The source motion encoding is associated with the present time frame t. In addition, the encoding is a feature vector summarizes the source skeleton motion of all time frames prior to the present time frame t, such as the previous time frame t−1 and additional time frames t−2, t−3, etc.

At block 708, the process 700 involves performing optimization processing on the source motion encoding. The optimization processing produces an optimized source motion encoding, such as optimized encoded states $h^{enc}$. For instance, the optimization engine 636 performs optimization for the encoded states 622. In some cases, operations related to block 708 are repeated, such as for multiple iterations included in the optimization.

At block 710, the process 700 involves providing the optimized source motion encoding as an input to a decoder of the trained RNN, such as the decoder 614. In addition, block 710 involves providing to the decoder one or more inputs related to a target object. For instance, the decoder receives a target object skeleton, a geometry encoding of the target object geometry, a root velocity of the target object, and joint positions of the target object. In some cases, each of the root velocity and the joint positions are associated with the previous time frame t−1. In addition, one or more of the target object skeleton or the target object geometry are based on a reference pose for the target object. Block 710 is described in regards to the optimized source motion encoding, but in some aspects, the decoder of the trained RNN receives a source motion encoding that has not modified by an optimization technique.

At block 712, the process 700 involves generating motion features via the decoder. For instance, the decoder 614 decodes the motion features from the inputs described in relation to block 710. In addition, the motion features are decoded as hidden states $h^{dec}$, such as the hidden states 624. The motion features are associated with the present time frame t. In addition, the motion features summarize additional motion features that were decoded from each time frame that is prior to the present time frame t. In some cases, the motion features are generated based on one or more motion constraints, such as the constraint data 627 that is associated with present time frame t.

At block 714, the process 700 involves providing the hidden states $h^{dec}$, i.e., decoded motion features, as an input to one or more linear layers of the trained RNN. For example, the linear layer 613 receives the hidden states 624. The one or more linear layers receive the hidden states $h^{dec}$ that are associated with the present time frame t.

At block 716, the process 700 involves generating, by the one or more linear layers, a root velocity of the target object and local joint rotations of the target object. For instance, the linear layers generates the root velocity and local joint rotations, such as the root velocity 616 and the local joint rotations 618, based on the hidden states $h^{dec}$, such as the hidden states 624. In addition, each of the root velocity and the local joint rotations are associated with the present time frame t.

At block 718, the process 700 involves performing optimization processing on the root velocity. The optimization processing produces an optimized root velocity. For instance, the optimization engine 636 performs optimization for the root velocity 616. In some cases, operations related to block 718 are repeated, such as for multiple iterations included in the optimization. In addition, the optimized root velocity can be stored by the trained RNN. For instance, the optimized root velocity can be provided to the decoder as an input at a subsequent time frame t+1, such as described in relation to block 710.

At block 720, the process 700 involves generating local joint positions of the target object. For instance, an FK layer included in the trained RNN generates the local joint positions. The local joint positions are associated with the present time frame t. In addition, the local joint positions are based on the local joint rotations described in regards to block 716. For example, the FK layer 630 generates the local joint positions 620 based on the local joint rotations 618.

At block 722, the process 700 involves providing the local joint positions to an SK layer included in the trained RNN. In addition, block 722 involves providing to the SK layer the target object skeleton and the target object geometry.

At block 724, the process 700 involves generating a geometry motion of the target object, via the SK layer. The target geometry motion is associated with the present time frame t. For example, the SK layer 628 generates the target geometry motion 632 based on the target geometry 604, the target skeleton 610, and the local joint positions 620.

At block 726, the process 700 involves generating global skeleton joint coordinates of the target object. The global skeleton joint coordinates are associated with the present time frame t. In addition, the global skeleton joint coordinates are generated by a combination component included in the trained RNN, such as a summation component, a concatenation component, or other suitable type of combination. The combination component is configured to combine the local joint positions associated with the present time frame t and the previous root velocity associated with the previous time frame t−1, such as described in regards to blocks 720 and 710. For example, the contact-aware motion retargeting neural network 615 includes a combination component that is configured to generate the skeleton coordinates 634 based on a combination (e.g., sum, concatenation, etc.) of the local joint positions 620 and the previous root velocity 606.

At block 728, the process 700 involves generating retargeted animation data for the target object. The retargeted animation data is generated based on the global skeleton joint coordinates and the geometry motion of the target object, such as described in regards to block 724 and 726. In addition, the retargeted animation data is associated with the present time frame t. The retargeted animation data shows an orientation and position of the target object, such as an orientation and position of a character that is animated within a virtual environment. For example, a rendering engine (e.g., the rendering engine 130) is configured to receive outputs from the trained RNN (e.g., the contact-aware motion retargeting neural network 615). Based on the target global skeleton joint coordinates and the target geometry motion from the trained RNN, the rendering engine renders (or otherwise generates) retargeted animation data depicting the target object with retargeted motion (or for a particular time frame, in a pose) that corresponds to the source motion.

In some aspects, one or more operations related to the process 700 are repeated. For example, operations related to one or more of blocks 708 or 718 are repeated for a quantity of iterations during an optimization process. In additional or alternative aspects, operations related to one or more of blocks 704-726 are repeated for each time frame included in a source motion.

Figure 8:
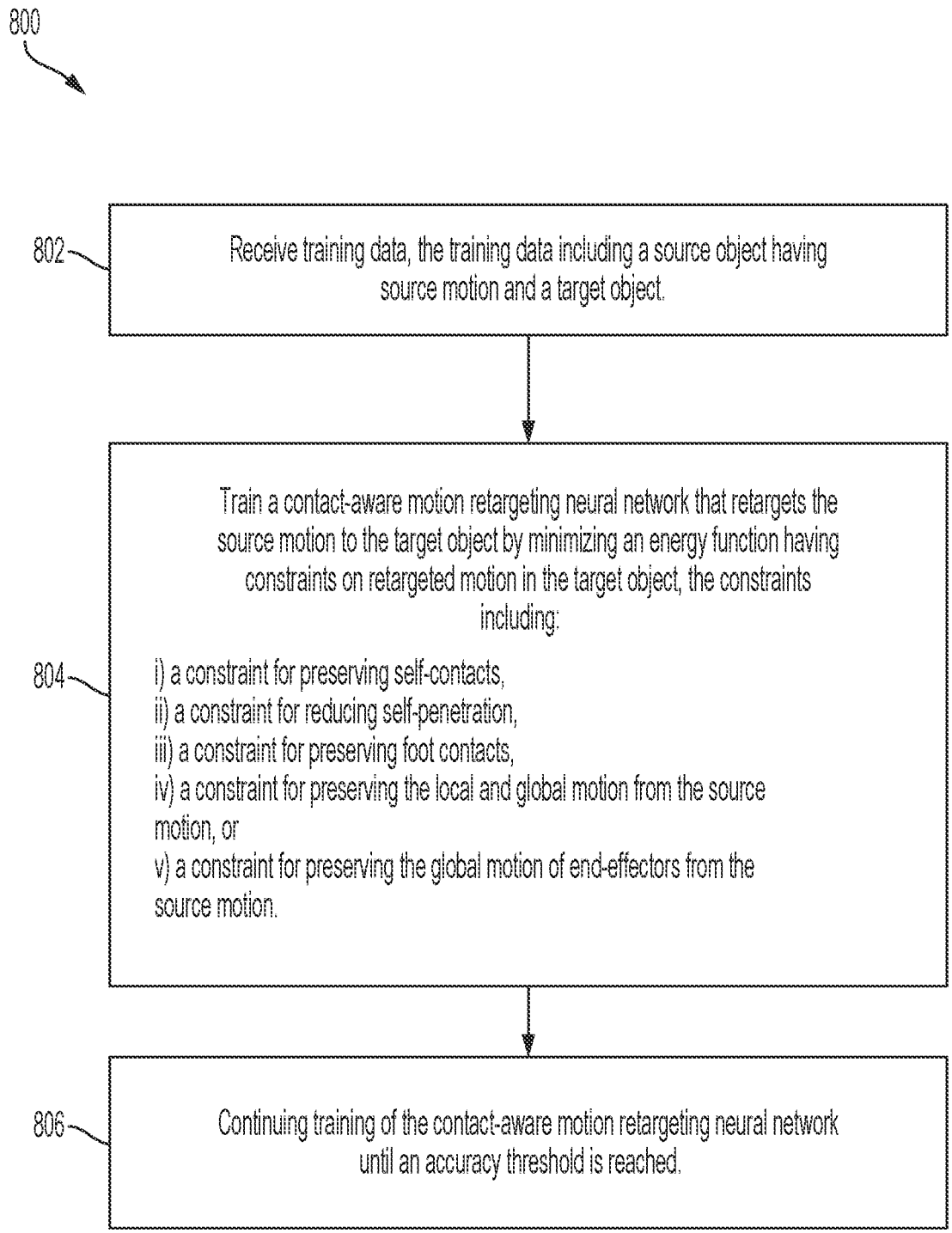
FIG. 8 depicts an example of a process for training a contact-aware motion retargeting neural network, according to certain aspects of this disclosure.

FIG. 8 is an example of a process 800 for contact-aware motion retargeting, according to certain aspects of this disclosure. One or more operations described with respect to FIG. 8 are used to train a contact-aware motion retargeting neural network (e.g., contact-aware motion retargeting neural network 115, contact-aware motion retargeting neural network 615) for retargeting motion to a target object. During training, the contact-aware motion retargeting neural network modifies one or more machine-learning models (e.g., encoder 621, decoder 614) to generate retargeted motion according certain aspects discussed herein. For example, the contact-aware motion retargeting neural network modifies the one or more machine-learning models to minimize one or more terms in a full energy function, such as described in regards to Equations 1-8. One or more processing devices (e.g., in the computing environment 100) implement operations depicted in FIG. 8 by executing suitable program code (e.g., encoder 621, decoder 614, etc.). For illustrative purposes, the process 800 is described with reference to certain examples depicted in the figures. Other implementations, however, are possible.

At block 802, the process 800 involves receiving training data. The training data is received, for instance, by a neural network or a sub-network of a neural network, such as the contact-aware motion retargeting neural network 615. The training data includes a source object that has source motion. In addition, the training data includes a target object. In some cases, the target object is in a reference pose, e.g., a pose that is not associated with motion. In additional or alternative aspects, the target object is associated with motion, such as training motion indicating a ground-truth of the training data.

At block 804, the process 800 involves training a contact-aware motion retargeting neural network using the training data. During training, the contact-aware motion retargeting neural network is trained to retarget the source motion into the target object. In addition, training the contact-aware motion retargeting neural network includes minimizing an energy function. In some cases, the energy function includes multiple constraints on the retargeted motion in the target object. For example, the energy function includes one or more of a constraint for preserving self-contacts, a constraint for reducing self-penetration, a constraint for preserving foot contacts, a constraint for preserving local and global motion from the source motion, or a constraint for preserving global motion of end-effectors (e.g., hand joints, feet joints) from the source motion.

For example, the contact-aware motion retargeting neural network 615 provides the source motion training data to the encoder 612. In addition, the contact-aware motion retargeting neural network 615 provides the target object training data to the decoder 614. Based on the training data, one or more of the encoder 612, the decoder 614, or other components of the neural network 615 modify terms related to a full energy function, such as the full energy function described in regards to Equation 1. For example, the encoder 612 or the decoder 614 modify one or more terms that describe constraints on the retargeted motion in the target object. During training of the neural network 615, the modified terms include a term for preserving self-contacts as described in regards to Equation 3, a term for reducing self-penetration 4, a term for preserving foot contacts as described in regards to Equation 5, a term for preserving local and global source motion in the retargeted motion as described in regards to Equation 7, and a term for preserving global source motion of end-effectors in the retargeted motion as described in regards to Equation 8. In some aspects, additional terms or functions may be modified during training of the neural network 615.

At block 806, the process 800 involves continuing the training of the contact-aware motion retargeting neural network until a threshold accuracy is reached. For example, a training output of the neural network, e.g., an outputted retargeted motion on the target object, is compared to the target object ground-truth motion described in regards to block 802. If differences between the ground-truth motion and the outputted retargeted motion are within the accuracy threshold, the contact-aware motion retargeting neural network completes the training. If differences between the ground-truth motion and the outputted retargeted motion are outside of the accuracy threshold (e.g., retargeted motion is not sufficiently accurate), the contact-aware motion retargeting neural network continues the training. For example, the neural network 615 identifies that training is complete if outputted retargeted motion is within an accuracy threshold of a ground-truth motion associated with the training data. Determining accuracy of the outputted retargeted motion includes, for instance, determining differences between vertex locations of the ground-truth motion with vertex locations of the target geometry motion 632. In addition, determining accuracy of the outputted retargeted motion includes determining differences between joint locations of the ground-truth motion with joint locations of the skeleton coordinates 634.

Figure 9:
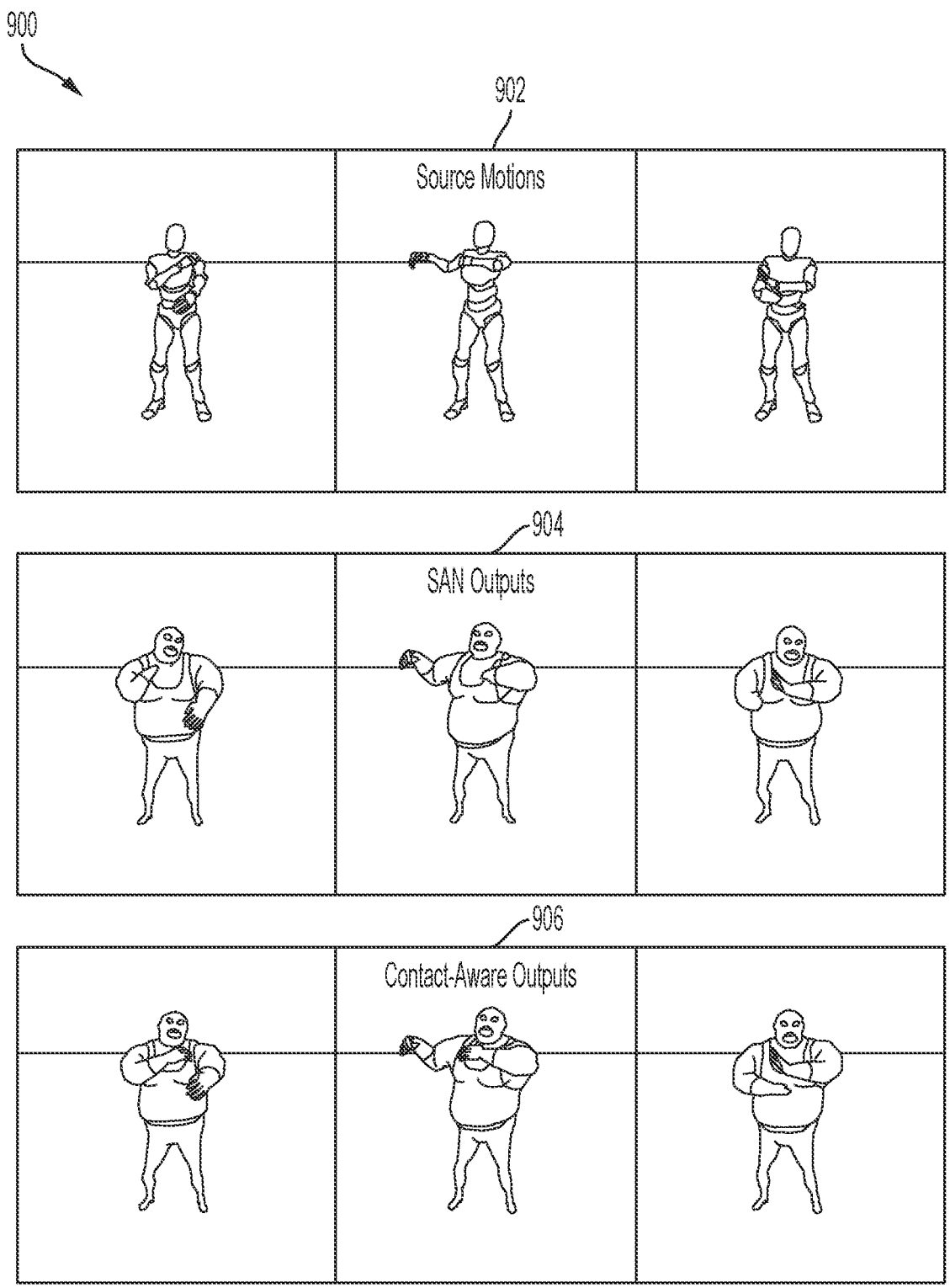
FIG. 9 depicts example comparisons of retargeted motion, according to certain aspects of this disclosure.

FIG. 9 depicts examples 900 of retargeted motion, according to certain aspects of this disclosure. FIG. 9 shows examples of retargeted motion in a qualitative comparison between a contemporary computer-based system and a contact-aware motion retargeting system that utilizes techniques described in the present disclosure. In this example, source motion 902 is retargeted to a target object. The source motion 902 includes motion associated with multiple time frames, such as three example time frames depicted in regards to outputs 904 and 906. The target object, in this case, is a 3D animated character, but other implementations are possible, such as retargeting motion into a 2D animated character or digital video (e.g., video footage of a person). Further, the contemporary computer-based system utilized for this comparison includes a skeleton-aware network ("SAN") that provides SAN outputs 904 based on the source motion 902. In addition, the source motion 902 is provided to a contact-aware motion retargeting system, such as the animation system 108 described herein, which produces retargeted motion depicted as contact-aware outputs 906. In this example, the contact-aware motion retargeting system and each of its components includes some or all of the capabilities described above, such as described with respect to, at least, the animation system 108 or the contact-aware motion retargeting neural network 615.

A visual inspection of the SAN outputs 904 and the contact-aware outputs 906 illustrates a improved result provided by the example contact-aware motion retargeting system. In this example, each of the SAN outputs 904 suffers from self-penetrations of the target object, where at least one hand of the character penetrates its own torso (e.g., self-penetration of geometry vertices). In comparison, the contact-aware outputs 906 clearly avoid such self-penetration. Moreover, the contact-aware outputs 906 avoid self-penetration or the target object, while maintaining appropriate contact points between the character's hand and torso. Visually inspecting the source motion 902 as compared to the contact-aware outputs 906 illustrates that the torso and hands of the target object in the contact-aware outputs 906 have a substantially similar position, including self-contacts, as the source object in the source motion 902. By contrast, visually inspecting the source motion 902 as compared to the SAN outputs 904 illustrates that the hands and torso of the target object in the SAN outputs 904 do not accurately reproduce the relative positions of the hands and torso of the source object in the source motion 902.

Figure 10:
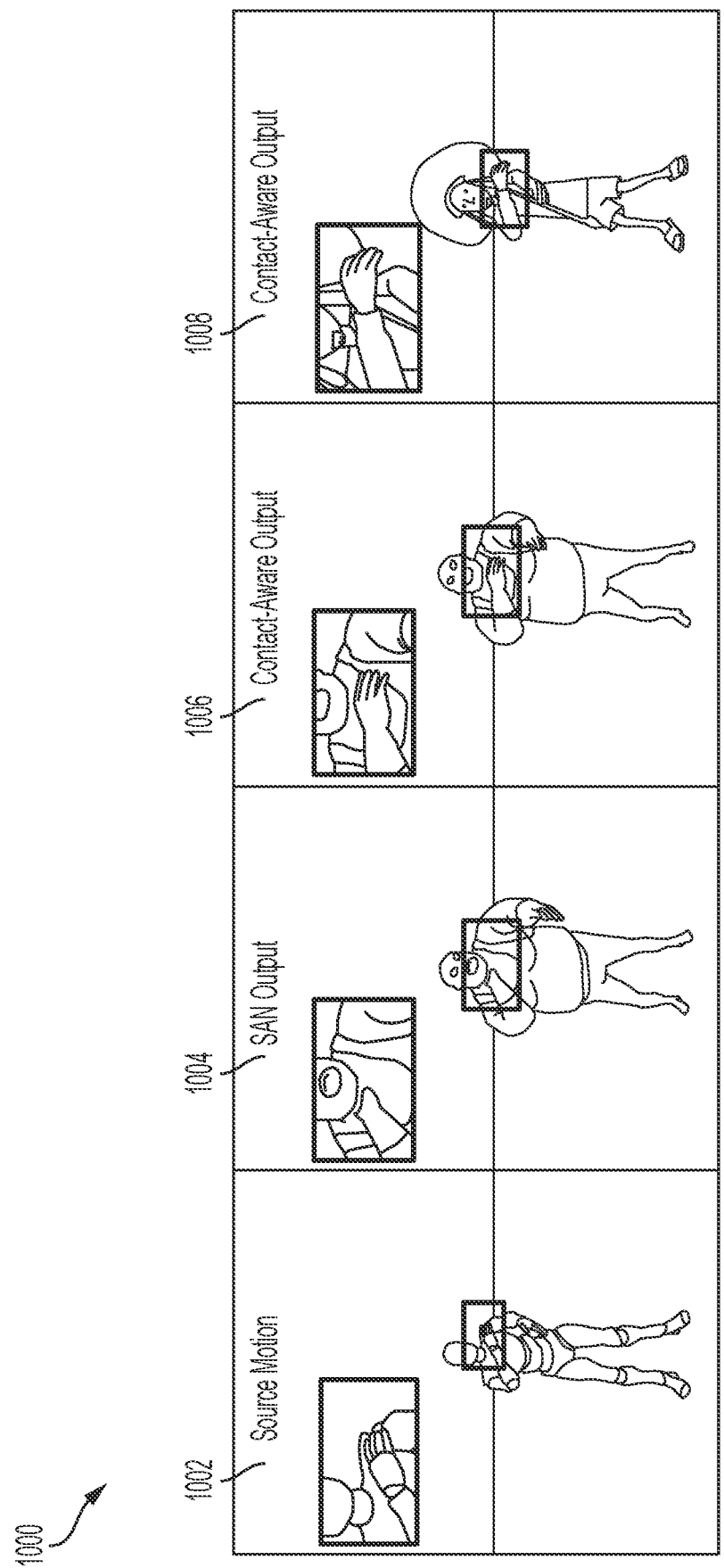
FIG. 10 depicts additional examples comparisons of retargeted motion, according to certain aspects of this disclosure.

FIG. 10 depicts other examples 1000 of retargeted motion, according to certain aspects of this disclosure. FIG. 10, like FIG. 9 above, shows additional examples of retargeted motion in a qualitative comparison between a contemporary computer-based system (SAN) and a contact-aware motion retargeting system that utilizes techniques described in the present disclosure. In this example, source motion 1002 is used to retarget a 3D animated character. The source motion 1002 includes motion associated with a particular time frame, such as the particular example time frame depicted in regards to output motions 1004, 1006, and 1008. FIG. 10 includes a close-up image depicting a self-contact of the source motion 1002, and additional close-up images depicting corresponding self-contacts or self-penetrations of outputs generated via the example contact-aware motion retargeting system and the SAN. The SAN provides a SAN output 1004 based on the source motion 1002, and the contact-aware motion retargeting system (such as the animation system 108) produces contact-aware outputs 1006 and 1008. In this example, the contact-aware motion retargeting system and each of its components includes some or all of the capabilities described above, such as described with respect to, at least, the animation system 108 or the contact-aware motion retargeting neural network 615.

In this example, a close-up view of the SAN output 1004 depicts a self-penetration of the target object, where the right hand of the animated character penetrates the animated character's own neckline. In comparison, the contact-aware motion retargeting system generates contact-aware outputs 1006 and 1008 that avoid such self-penetration. And again, each of the contact-aware outputs 1006 and 1008 avoids self-penetration while maintaining self-contacts between the character's hand and torso, as included in the source motion 1002. Moreover, the contact-aware outputs 1006 and 1008 avoid self-penetration and maintain the self-contacts despite a significant difference in target geometries of the animated characters. For example, the contact-aware output 1006 demonstrates motion retargeting into a character model having a relatively deep chest and broad shoulders. In addition, the contact-aware output 1008 demonstrates motion retargeting into a character model having a relatively slim torso and thin shoulders. Even with the significant variance between the target geometries of the animated characters, the contact-aware outputs 1006 and 1008 maintain self-contacts between their respective right-hand thumbs and shoulders, without any self-penetrations.

Example Test Results for Effectiveness of Contact-Aware Motion Retargeting System Tables 1-2 include observations from experiments using a contact-aware motion retargeting system, such as the contact-aware motion retargeting system 110, according to certain aspects of the present disclosure. Table 1 describes quantitative results of an example ablation study for testing a contact-aware motion retargeting system. In this example ablation study, a contact-aware motion retargeting system is trained using an energy function that omits (e.g., ablates) one or more terms of a full energy function, such as described in regards to Equation 1. Performance of the trained contact-aware motion retargeting system is evaluated for multiple terms ablated from the energy function.

TABLE 1

| Technique | Geometry evaluation | | Motion evaluation | |
|---|---|---|---|---|
| | Self-Penetrations | Vertex Contact MSE | Foot Contact Accuracy | Global Positon MSE |
| $E_{skel}$ | 7.16 | 4.23 | 0.71 | 0.56 |
| $E_{skel} + E_{foot}$ | 6.94 | 4.21 | 0.80 | 0.66 |
| $E_{skel} + E_{foot} + E_{int}$ without $w_{r,i}$ | 3.94 | 7.94 | 0.82 | 1.00 |

TABLE 1-continued

| Technique | Geometry evaluation | | Motion evaluation | |
|---|---|---|---|---|
| | Self-Penetrations | Vertex Contact MSE | Foot Contact Accuracy | Global Positon MSE |
| $E_{skel} + E_{foot} + E_{int}$ with $w_{r,i}$ | 4.24 | 6.79 | 0.81 | 0.97 |
| $E_{full}$ | 5.07 | 4.52 | 0.76 | 1.54 |
| $E_{full}$ + ESO | 4.70 | 3.87 | 0.97 | 0.48 |

Performance is evaluated for a contact-aware motion retargeting system trained based on a skeleton-based motion modeling term $E_{skel}$, including local and global motion terms (e.g., $E_{weak}$) and end-effector motion terms (e.g., $E_{ee}$). At row 1, Table 1 indicates that, in comparison to additional training terms (e.g., rows 2-6), using only the skeleton term results in lower global position error, evaluated at 0.56, while foot contact accuracy is lower and quantities of self-penetrations are higher, evaluated at 0.71 and 7.16.

Performance is also evaluated for a contact-aware motion retargeting system trained based on a skeleton-based motion modeling term $E_{skel}$ and a foot contact modeling term, $E_{foot}$. At row 2, Table 1 indicates that using skeleton-based motion and foot contact modeling terms results in a significant increase in foot contact accuracy, evaluated at 0.80 (compared to 0.71 in row 1).

Performance is also evaluated for a contact-aware motion retargeting system trained based on a skeleton-based motion modeling term $E_{skel}$, a foot contact modeling term $E_{foot}$, and a self-penetration reduction function $E_{int}$. At rows 3 and 4, Table 1 indicates, respectively, the self-penetration reduction function $E_{int}$ without the weight factor $w_{r,i}$ and with the weight factor $w_{r,i}$. At row 3, Table 1 indicates that using a self-penetration reduction function $E_{int}$ without the weight factor $w_{r,i}$ results in reduced self-penetrations, evaluated at 3.94, but increased error for vertex contact, evaluated at 7.94. For example, omitting the weights $w_{r,i}$ and $w_{i,r}$ may result in retargeted motion that reduces all self-penetrations, including those that involve nearby vertices that are often not noticeable by viewers. In addition, omitting the weights $w_{r,i}$ and $w_{i,r}$ could result in motion that appears "stiff," where most self-contacts are avoided. At row 4, Table 1 indicates that using a self-penetration reduction function $E_{int}$ with the weight factor $w_{r,i}$ results in a slight increase in self-penetrations compared to row 3, evaluated at 4.24 (compared to 3.94 in row 3), while errors for vertex contact and global position decrease, evaluated at 6.79 and 0.97 (compared to 7.94 and 1.00 in row 3). In some cases, including the weights $w_{r,i}$ and $w_{i,r}$ may result in retargeted motion with a more relaxed range of the character motion and improved overall motion quality and contact handling, as compared to omitting the weights $w_{r,i}$ and $w_{i,r}$.

Performance is also evaluated for a contact-aware motion retargeting system trained based on a full energy function $E_{full}$. The full energy function $E_{full}$ includes a skeleton-based motion modeling term $E_{skel}$ and a geometry-based motion modeling term $E_{geo}$. As described in regards to Equations 1-2, $E_{geo}$ can include a foot contact modeling term $E_{foot}$, a self-penetration reduction function $E_{int}$, and a self-contact preservation term $E_{j2j}$. At row 5, Table 1 indicates that using a full energy function $E_{full}$ results in a slight increase in self-penetrations, evaluated at 5.07 (compared to 4.24 in row 4) and a slight decrease in foot contact accuracy, evaluated at 0.76 (compared to 0.81 in row 4).

Performance is also evaluated for a contact-aware motion retargeting system trained based on a full energy function $E_{full}$ with encoder-space optimization ("ESO"), such as optimizations described above in regards to the architecture 600. At row 6, Table 1 indicates that using a full energy function $E_{full}$ with ESO results in large improvements to vertex contact error, global position error, and foot contact accuracy while providing moderate reduction in self-penetrations (compared to rows 1-5).

Table 2 describes quantitative results of an example comparison between a contact-aware motion retargeting technique and contemporary techniques for motion retargeting. In this example technique comparison study, a contact-aware motion retargeting system is trained using a full energy function with ESO, such as described in regards to Equations 1-8 and optimizations of the architecture 600. Performance of the trained contact-aware motion retargeting system is compared to performance of contemporary systems trained using multiple additional motion retargeting techniques.

TABLE 2

| Technique | Geometry evaluation | | Motion evaluation | |
|---|---|---|---|---|
| | Self-Penetrations | Vertex Contact MSE | Accuracy | MSE |
| $E_{full}$ + ESO | 4.70 | 3.87 | 0.97 | 0.48 |
| $E_{full}$ + IK | 5.09 | 4.52 | 0.82 | 1.58 |
| SAN | 5.95 | 5.26 | 0.63 | 0.82 |
| SAN + IK | 6.21 | 5.78 | 0.73 | 0.74 |
| PMnet | 13.46 | 23.11 | 0.70 | 3.67 |
| NKN | 10.98 | 14.86 | 0.71 | 8.15 |

Performance is evaluated for a contact-aware motion retargeting system that includes a full energy function $E_{full}$ with ESO, such as the contact-aware motion retargeting system 110. Performance is also evaluated for additional motion retargeting techniques that include skeleton-aware networks ("SAN"), pose and movement networks ("PMnet"), and neural kinematic networks ("NKN"). In some cases, a technique being evaluated includes an inverse kinematics ("IK") stage, such as an IK post-processing stage.

At row 1, Table 2 indicates that the contact-aware motion retargeting system using the full energy function $E_{full}$ with ESO outperforms each compared motion retargeting technique. For example, row 1 indicates that the contact-aware motion retargeting system using $E_{full}$ with ESO performs with reduced self-penetrations, higher foot contact accuracy, and reduced vertex contact error and global position error (compared to rows 2-6). In some cases, the contact-aware motion retargeting system using the full energy function $E_{full}$, with ESO provides improved self-contact handling, self-penetration avoidance, and overall motion quality (e.g., natural-appearing motion of an animated character).

At row 2, Table 2 indicates performance for a contact-aware motion retargeting system that includes an IK stage. In this example comparison, the contact-aware motion retargeting system with IK uses a full energy function $E_{full}$ and omits ESO techniques. At row 2, Table 2 indicates that the contact-aware motion retargeting system with IK provides improvements to vertex contact error, global position error, and foot contact accuracy as compared to SAN techniques, a PMnet technique, and an NKN technique (e.g., at rows 3-6), but underperforms the contact-aware motion retargeting system using the full energy function $E_{full}$ with ESO (e.g., at row 1).

At row 3, Table 2 indicates performance for a SAN motion retargeting technique. At row 4, Table 2 indicates performance for a SAN motion retargeting technique that includes an IK stage. At rows 3-4, Table 2 indicates that the SAN motion retargeting techniques provide moderate decreases in performance as compared to the contact-aware motion retargeting systems (e.g., at rows 1-2).

At row 5, Table 2 indicates performance for a PMnet motion retargeting technique. The PMnet technique provides decreased overall performance as compared to the contact-aware motion retargeting systems (e.g., at rows 1-2) and also compared to the SAN motion retargeting techniques (e.g., at rows 3-4).

At row 6, Table 2 indicates performance for an NKN motion retargeting technique. The NKN technique provides decreased performance as compared to the contact-aware motion retargeting systems (e.g., at rows 1-2) and also compared to the SAN motion retargeting techniques (e.g., at rows 3-4). Compared to the PMnet technique, the NKN technique provides improvements in self-penetrations and vertex contact error, similar foot contact accuracy, and increased global position error (e.g., row 6 as compared to row 5).

Example Computing System for Contact-Aware Retargeting of Skinned Motion

Figure 11:
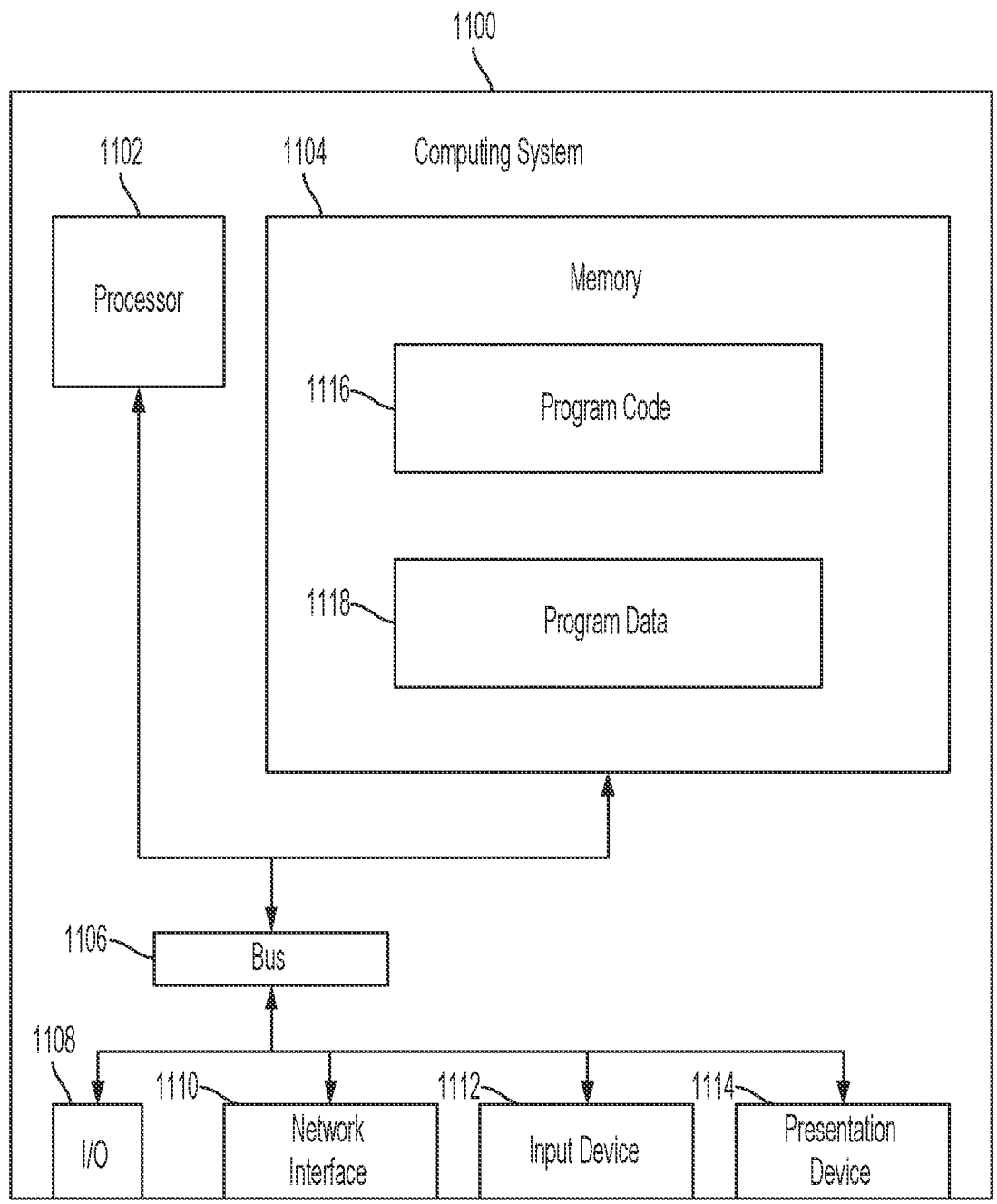
FIG. 11 depicts an example of a computing system that performs certain operations described herein, according to certain aspects of this this disclosure.

Any suitable computing system can be used for performing the operations described herein. FIG. 11 depicts an example computing system 1100 that performs certain operations described herein, according to certain aspects of this disclosure. In some aspects, the computing system 1100 executes animation system 108 of FIG. 1. In other aspects, separate computing systems having devices similar to those depicted in FIG. 11 (e.g., a processor, a memory, etc.) separately execute parts of the animation system 108.

The example computing system 1100 includes a processor 1102 communicatively coupled to one or more memory devices 1104. The processor 1102 executes computer-executable program code 1116 stored in a memory device 1104, accesses information (e.g., program data 1118) stored in the memory device 1104, or both. Examples of the processor 1102 include a microprocessor, an application-specific integrated circuit (ASIC), a field-programmable gate array (FPGA), or any other suitable processing device. The processor 1102 includes any number of processing devices, including a single processing device.

The memory device 1104 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The computing system 1100 also includes a number of external or internal devices, such as input or output devices. For example, the computing system 1100 is shown with one or more input/output (I/O) interfaces 1108. An I/O interface 1108 receives input from input devices (e.g., input device 1112) or provide output to output devices. One or more buses 1106 are also included in the computing system 1100. The bus 1106 communicatively couples one or more components of a respective one of the computing system 1100.

The computing system 1100 executes program code 1116 that configures the processor 1102 to perform one or more operations described herein. In some examples, the program code 1116 includes program code for the motion retargeting system 110, source motion encoder 112, source motion decoder 114, or optimization engine 116, or other suitable applications to perform operations described herein. The program code 1116 is resident in the memory device 1104 or any suitable computer-readable medium and is executed by the processor 1102 or another suitable processor. In additional or alternative aspects, the program code 1116 described above is stored in one or more other memory devices accessible via data network 104.

The computing system 1100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and/or the like. The computing system 1100 is able to communicate with one or more other computing devices via data network 104 using the network interface device 1110.

In some aspects, the computing system 1100 also includes presentation device 1114. A presentation device 1114 includes any device or group of devices for providing visual, auditory, or other suitable sensory output. Non-limiting examples of presentation device 1114 include a touchscreen, a monitor, a speaker, a separate mobile computing device, etc. In some aspects, presentation device 1114 includes a remote client-computing device, such as client device 102, that communicates with computing system 1100 using one or more data networks (e.g., data network 104) described herein. Other aspects omit presentation device 1114.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, this disclosure has been presented for the purpose of providing examples rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The systems discussed herein are not limited to any particular hardware architecture or configuration. A computing device includes any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, script, or other type of language or combinations of languages may be used to implement the teachings herein in software to be used in programming or configuring a computing device. The order of the blocks presented in the examples above can be varied—e.g., blocks can be re-ordered, combined, and/or broken into sub-blocks. Certain blocks or processes can be performed in parallel.

The invention claimed is:

1. A method performed by one or more computing devices, the method comprising:
receiving source motion for a source object over a time period, the source object characterized by a source object skeleton and a source object geometry, wherein the source object geometry includes multiple source skin vertices, wherein the source motion for the source object comprises a motion of the source object skeleton and a motion of the multiple source skin vertices included in the source object geometry over the time period, and wherein the source motion includes, at a first time frame in the time period, a contact between a first source vertex and a second source vertex of the multiple source skin vertices included in the source object geometry; and
retargeting, via a trained machine-learning model, the source motion to a target object, the target object characterized by a target object skeleton and a target object geometry, wherein the target object geometry is different from the source object geometry, wherein the target object geometry includes multiple target skin vertices that are different from the multiple source skin vertices included in the source object geometry,
wherein the retargeting includes:
calculating an energy function that includes a) a first constraint for preserving a contact between a first target vertex and a second target vertex of the target object geometry in a target motion based upon the contact between the first source vertex and the second source vertex of the source object geometry, and b) a second constraint for reducing self-penetration between the first target vertex and the second target vertex of the target object geometry in the target motion, and
causing, via the retargeting, the target object to have the target motion over the time period that is based upon the source motion, wherein the target motion describes that, at the first time frame in the time period, the first target vertex and the second target vertex of the multiple target skin vertices included in the target object geometry are in contact without any self-penetration of the target object geometry at the first target vertex and the second target vertex.

2. The method of claim 1, further comprising:
determining that the first source vertex contacts the second source vertex at the first time frame based upon the motion of the multiple source skin vertices included in the source object geometry;
determining that the first target vertex corresponds to the first source vertex and that the second target vertex corresponds to the second source vertex; and
generating the first constraint as a self-contact constraint indicating a self-contact between the first target vertex and the second target vertex,
wherein retargeting the source motion to the target object is based on the self-contact constraint.

3. The method of claim 1, wherein the retargeting comprises:
responsive to determining the contact between the first source vertex and the second source vertex in the source motion, causing the first target vertex and the second target vertex to have a contact in the target motion.

4. The method of claim 1, further comprising:
providing the source motion for the source object as input to the trained machine-learning model; and
providing the target object as input to the trained machine-learning model,
wherein the retargeting comprises generating, by the trained machine-learning model, the target motion for the target object based on the source motion for the source object.

5. The method of claim 1, further comprising training the trained machine-learning model to generate retargeted motion, wherein the training comprises:
for a training source motion and a training target object provided as input to a recurrent neural network (RNN), training the RNN to output a retargeted motion of the training target object by minimizing the energy function, wherein minimizing the energy function includes:
training the first constraint by preserving a self-contact between vertices of a geometry of the training target object in the output retargeted motion based upon an additional self-contact between vertices of a training source geometry associated with the training source motion; and
training the second constraint by reducing self-penetration between the vertices of the geometry of the training target object in the output retargeted motion.

6. The method of claim 5, wherein the first constraint is characterized by an expression:

$$\frac{1}{|v|}\sum_{(i,j)\in v}\|v_i - v_j\|^2$$

wherein $v_i$ and $v_j$ are vertices of the geometry of the training target object that are to be in contact at a time point in the output retargeted motion.

7. The method of claim 5, wherein the second constraint is characterized by an expression:

$$\sum_{(r,i)\in \mathcal{F}} \left( \sum_{v_k \in f_r} \mathcal{W}_{r,i} \|-\psi_i(v_j) n_j\|^2 + \sum_{v_k \in f_i} \mathcal{W} r_{i,r} \|-\psi_r(v_k) n_k\|^2 \right)$$

wherein:
$f_r$ and $f_i$ represent triangles in the geometry of the training target object, $\psi_i$ and $\psi_r$ describe respective distance fields for triangles $f_r$ and $f_i$, where $\psi_i$ and $\psi_r$ are positive when the triangles $f_r$ and $f_i$ self-penetrate at a time point in the output retargeted motion, and weights $\mathcal{W}_{r,i}$ and $\mathcal{W}_{i,r}$ re based on a geodesic distance between the triangles $f_r$ and $f_i$.

8. The method of claim 5, wherein the energy function further includes:
a third constraint for preserving a contact between a ground surface and a foot joint of the training target object in the output retargeted motion;
a fourth constraint for preserving a local motion and a global motion from the training source motion in the output retargeted motion; and
a fifth constraint for preserving a global motion of end-effectors of a training source skeleton associated with the training source motion in the output retargeted motion.

9. The method of claim 4, wherein generating, by the trained machine-learning model, the target motion for the target object based on the source motion for the source object comprises:
providing as input, to an encoder within the trained machine-learning model, the motion of the source object skeleton;
generating, by the encoder, an encoding of the motion of the source object skeleton at the first time frame in the time period;
providing as input, to a decoder within the trained machine-learning model, the encoding of the motion of the source object skeleton, the target object skeleton, an encoding of the target object geometry at the first time frame in the time period, a root velocity of the target object at a second time frame immediately preceding the first time frame in the time period, and a set of joint positions of the target object at the second time frame; and
generating, by the decoder, hidden states describing motion features of the target object at the first time frame.

10. The method of claim 9, wherein the generating, by the trained machine-learning model, the target motion for the target object based on the source motion for the source object further comprises:
providing as input, to a linear layer within the trained machine-learning model, the hidden states;
generating, by the linear layer, a set of local joint rotations of the target object at the first time frame, and a root velocity of the target object at the first time frame;
providing as input, to a forward kinematics ("FK") layer within the trained machine-learning model, the set of local joint rotations; and
generating, by the FK layer, a set of local joint positions of the target object at the first time frame.

11. The method of claim 10, wherein the encoding of the motion of the source object skeleton and the root velocity of the target object at the first time frame are optimized via an encoder-space optimization,
wherein the optimized encoding of the motion of the source object skeleton is provided as the input to the decoder.

12. The method of claim 10, wherein the generating, by the trained machine-learning model, the target motion for the target object based on the source motion for the source object further comprises:
providing as input, to a skinning ("SK") layer within the trained machine-learning model, the set of local joint positions of the target object at the first time frame, the target object skeleton, and the target object geometry;
generating, by the SK layer, a motion of the target object geometry at the first time frame;
providing as input, to combination component within the trained machine-learning model, the set of local joint positions of the target object at the first time frame and the root velocity of the target object at the second time frame; and
generating, by the combination component, global skeleton joint coordinates of the target object skeleton at the first time frame.

13. The method of claim 12, further comprising:
generating retargeted animation data of the target object at the first time frame, the retargeted animation data showing orientation and position the target object at the first time frame,
wherein the retargeted animation data is based on the global skeleton joint coordinates of the target object skeleton at the first time frame and the motion of the target object geometry at the first time frame.

14. A system for retargeting motion, the system comprising:
a trained contact-aware motion retargeting neural network configured for:
receiving source motion for a source object over a time period, the source object characterized by a source object skeleton and a source object geometry, wherein the source object geometry includes multiple source skin vertices, wherein the source motion for the source object comprises a motion of the source object skeleton and a motion of the multiple source skin vertices included in the source object geometry over the time period, and wherein the source motion includes, at a first time frame in the time period, a contact between a first source vertex and a second source vertex of the multiple source skin vertices included in the source object geometry; and
retargeting the source motion to a target object, the target object characterized by a target object skeleton and a target object geometry, wherein the target object geometry is different from the source object geometry, wherein the target object geometry includes multiple target skin vertices that are different from the multiple source skin vertices included in the source object geometry,
wherein the retargeting includes:
calculating an energy function that includes a) a first constraint for preserving a contact between a first target vertex and a second target vertex of the target object geometry in a target motion based upon the contact between the first source vertex and the second source vertex of the source object geometry, and b) a second constraint for reducing self-penetration between the first target vertex and the second target vertex of the target object geometry in the target motion, and
causing, via the retargeting, the target object to have the target motion over the time period that is based upon the source motion, wherein the target motion describes that, at the first time frame in the time period, the first target vertex and the second target vertex of the multiple target skin vertices included in the target object geometry are in contact without any self-penetration of the target object geometry at the first target vertex and the second target vertex.

15. The system of claim 14, the trained contact-aware motion retargeting neural network further configured for:
  determining that the first source vertex contacts the second source vertex at the first time frame based upon the motion of the multiple source skin vertices included in the source object geometry;
  determining that the first target vertex corresponds to the first source vertex and that the second target vertex corresponds to the second source vertex; and
  generating the first constraint as a self-contact constraint indicating a self-contact between the first target vertex and the second target vertex,
  wherein retargeting the source motion to the target object is based on the self-contact constraint.

16. The system of claim 14, wherein the retargeting comprises:
  responsive to determining the contact between the first source vertex and the second source vertex in the source motion, causing the first target vertex and the second target vertex to have a contact in the target motion.

17. A non-transitory computer-readable medium embodying program code for retargeting motion, the program code comprising instructions which, when executed by a processor, cause the processor to perform operations comprising:
  receiving source motion for a source object over a time period, the source object characterized by a source object skeleton and a source object geometry, wherein the source object geometry includes multiple source skin vertices, wherein the source motion for the source object comprises a motion of the source object skeleton and a motion of the multiple source skin vertices included in the source object geometry over the time period, and wherein the source motion includes, at a first time frame in the time period, a contact between a first source vertex and a second source vertex of the multiple source skin vertices included in the source object geometry; and
  retargeting, via a trained machine-learning model, the source motion to a target object, the target object characterized by a target object skeleton and a target object geometry, wherein the target object geometry is different from the source object geometry, wherein the target object geometry includes multiple target skin vertices that are different from the multiple source skin vertices included in the source object geometry,
  wherein the retargeting includes:
  calculating an energy function that includes a) a first constraint for preserving a contact between a first target vertex and a second target vertex of the target object geometry in a target motion based upon the contact between the first source vertex and the second source vertex of the source object geometry, and b) a second constraint for reducing self-penetration between the first target vertex and the second target vertex of the target object geometry in the target motion, and
  causing, via the retargeting, the target object to have the target motion over the time period that is based upon the source motion, wherein the target motion describes that, at the first time frame in the time period, the first target vertex and the second target vertex of the multiple target skin vertices included in the target object geometry are in contact without any self-penetration of the target object geometry at the first target vertex and the second target vertex.

18. The non-transitory computer-readable medium of claim 17, the operations further comprising:
  determining that the first source vertex contacts the second source vertex at the first time frame based upon the motion of the multiple source skin vertices included in the source object geometry;
  determining that the first target vertex corresponds to the first source vertex and that the second target vertex corresponds to the second source vertex; and
  generating the first constraint as a self-contact constraint indicating a self-contact between the first target vertex and the second target vertex,
  wherein retargeting the source motion to the target object is based on the self-contact constraint.

19. The non-transitory computer-readable medium of claim 17, wherein the retargeting comprises:
  responsive to determining the contact between the first source vertex and the second source vertex in the source motion, causing the first target vertex and the second target vertex to have a contact in the target motion.

20. The non-transitory computer-readable medium of claim 17, the operations further comprising:
  providing the source motion for the source object as input to the trained machine-learning model; and
  providing the target object as input to the trained machine-learning model,
  wherein the retargeting comprises generating, by the trained machine-learning model, the target motion for the target object based on the source motion for the source object.

* * * * *